US010143988B2

(12) United States Patent
Tracy et al.

(10) Patent No.: US 10,143,988 B2
(45) Date of Patent: Dec. 4, 2018

(54) METHOD FOR SYNTHESIZING NON-SPHERICAL NANOSTRUCTURES

(71) Applicant: North Carolina State University, Raleigh, NC (US)

(72) Inventors: Joseph B. Tracy, Cary, NC (US); Wei-Chen Wu, Taipei (TW); Brian S. Chapman, Raleigh, NC (US); Laurel R. Rowe, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 256 days.

(21) Appl. No.: 15/149,670

(22) Filed: May 9, 2016

(65) Prior Publication Data
US 2016/0325257 A1 Nov. 10, 2016

Related U.S. Application Data

(60) Provisional application No. 62/158,887, filed on May 8, 2015.

(51) Int. Cl.
*B01J 13/22* (2006.01)
*B01J 13/14* (2006.01)

(52) U.S. Cl.
CPC .............. *B01J 13/22* (2013.01); *B01J 13/14* (2013.01)

(58) Field of Classification Search
CPC .................................. B01J 13/22; B01J 13/14
USPC ......................................................... 428/406
See application file for complete search history.

(56) References Cited

U.S. PATENT DOCUMENTS

| | | | |
|---|---|---|---|
| 6,041,600 | A | 3/2000 | Silverbrook |
| 7,902,736 | B2 | 3/2011 | Hudspeth et al. |
| 2010/0060109 | A1 | 3/2010 | Russell et al. |
| 2015/0239049 | A1 | 8/2015 | Tracy et al. |

FOREIGN PATENT DOCUMENTS

| | | |
|---|---|---|
| CN | 101230208 A | 7/2008 |
| CN | 102319435 A | 1/2012 |
| EP | 2714073 A1 | 4/2014 |
| WO | 2013095736 A2 | 6/2013 |
| WO | 2013112856 A2 | 8/2013 |
| WO | 2013167152 A1 | 11/2013 |
| WO | 2013175503 A2 | 11/2013 |

OTHER PUBLICATIONS

Chungand Wang et al: "Synthesis, Assembly,and Biofunctionalization of Silica-Cated Gold Nanorods . . . " Adv. Funct. mater. 2006, 16, 1673-1678.*
Cyrille Gautier et al: "Pigments based on silica-coated gold nanorods . . . " Gold Bulletin, vol. 43, No. 2, 2010.*
Yun-sheng Chen et al: "Silica-coated gold nanorods . . . " Nano Letters, vol. 11, No. 2, Feb. 9, 2011, pp. 348-354.*
Abadeer, Nardine S. et al., "Distance and Plasmon Wavelength Dependent Fluorescence of Molecules Bound to Silica-Coated Gold Nanorods," ACS Nano, vol. 8, No. 8, 2014, pp. 8392-8406.
Author Unknown, "Applications of Gold Nanoparticles," NanoHybrids, 2016, date accessed: May 12, 2016, 3 pages, http://nanohybrids.net/pages/applications.
Author Unknown, "Global Markets for Nanocomposites, Nanoparticles, Nanoclays, and Nanotubes," BCC Research LLC, Jan. 2012, 2 pages, http://www.bccresearch.com/market-research/nanotechnology/nanocomposites-global-markets-nan021e.html.
Author Unknown, "Nanorod," Wikipedia, last modified on Feb. 6, 2016, 3 pages, https://en.wikipedia.org/wiki/Nanorod#Gold_nanorods.
Author Unknown, "Silver Coated Gold Nanorods," NanoSeedz, date accessed: May 12, 2016, 2 pages, http://nanoseedz.com/Gold_Nanorods_Metal_Coated.html.
Author Unknown, "Stöber process," Wikipedia, last modified Feb. 29, 2016, 3 pages, https://en.wikipedia.org/wiki/Stöber_process.
Chen, Yun-Sheng et al., "Silica-Coated Gold Nanorods as Photoacoustic Signal Nanoamplifiers," Nano Letters, vol. 11, No. 2, Feb. 9, 2011, pp. 348-354.
Dreaden, Erik C. et al., "Detecting and Destroying Cancer Cells in More than One Way with Noble Metals and Different Confinement Properties on the Nanoscale," Accounts of Chemical Research, vol. 45, No. 11, 2012, pp. 1854-1865.
Gautier, Cyrille et al., "Pigments based on silica-coated gold nanorods: Synthesis, colouring strength, functionalisation, extrusion, thermal stability and colour evolution," Gold Bulletin, vol. 43, No. 2, 2010, pp. 94-104.
Gorelikov, Ivan et al., "Single-Step Coating of Mesoporous Silica on Cetyltrimethyl Ammonium Bromide-Capped Nanoparticles," Nano Letters, vol. 8, No. 1, 2008, pp. 369-373.
Harper, Tim, "Nanodiagnostics will be a $50-billion Market by 2021," PRWeb UK, Mar. 15, 2012, 3 pages, http://uk.prweb.com/releases/2012/3/prweb9279336.htm.
Holliday, Richard, "Production and Uses of Gold Nanomaterials," Industry Week, Sep. 5, 2008, 5 pages, http://www.industryweek.com/none/production-and-uses-gold-nanomaterials.

(Continued)

*Primary Examiner* — Leszek B Kiliman
(74) *Attorney, Agent, or Firm* — Withrow & Terranova, P.L.L.C.

(57) ABSTRACT

The disclosure provides methods of synthesizing non-spherical nanostructures. One embodiment has steps of providing a solution of nanoparticles (NPs) wherein each of the NPs comprises a non-spherical NP that includes gold and a surfactant coating covering the non-spherical NP; mixing the NPs and a pH modifier solution making a pH-modified solution of NPs having a pH within a predefined pH range; and adding a silica precursor solution to the solution of nanoparticles at a constant rate for at least one (1) minute to provide a homogeneous silica solution of NPs. Another embodiment has steps of providing a solution of NPs wherein each of the NPs comprises a non-spherical NP that includes gold and a surfactant coating covering the non-spherical NP; and adding a silica precursor solution to the solution of nanoparticles at a constant rate for at least one (1) minute to provide a homogeneous silica solution of NPs.

35 Claims, 24 Drawing Sheets

(56) References Cited

OTHER PUBLICATIONS

Huang, Ching-Mao et al., "Controlled epitaxial growth of mesoporous silica/gold nanorod nanolollipops and nanodumb-bells," APL Materials 2, vol. 11, Oct. 2014, 8 pages.

Kozek, Krystian A. et al., "Large-Scale Synthesis of Gold Nanorods through Continuous Secondary Growth," Chemistry of Materials, vol. 25, 2013, pp. 4537-4544.

Lee, Jung-Hyun et al., "Facile Preparation of Highly-Scattering Metal Nanoparticle-Coated Polymer Microbeads and Their Surface Plasmon Resonance," Journal of the American Chemical Society, vol. 131, No. 14, 2009, pp. 5048-5049.

Liu, Jun et al., "Sonication-assisted synthesis of multi-functional gold nanorodisilica core-shell nanostructures," Journal of Alloys and Compounds, vol. 551, 2013, pp. 405-409.

Lu, Yu et al., Modifying the Surface Properties of Superparamagnetic Iron Oxide Nanoparticles through a Sol-Gel Approach, Nano Letters, vol. 2, No. 3, 2002, pp. 183-186.

Ma, Kai et al., "Controlling Growth of Ultrasmall Sub-10 nm Fluorescent Mesoporous Silica Nanoparticles," Chemistry of Materials, vol. 25, No. 5, 2013, pp. 677-691.

Pita, Isabel A. et al., "Heteroaggregation assisted wet synthesis of core-shell silver-silica-cadmium selenide nanowires," Nanoscale, vol. 8, 2016, pp. 1200-1209.

Pissuwan, Dakrong et al., "Prospects for Gold Nanorod Particles in Diagnostic and Therapeutic Applications," Biotechnology and Genetic Engineering Reviews, vol. 25, 2008, pp. 93-112.

Seh, Zhi Wei et al., "Anisotropic Growth of Titania onto Various Gold Nanostructures: Synthesis, Theoretical Understanding, and Optimization for Catalysis," Angewandte Chemie International Edition, vol. 50, No. 43, 2011, pp. 10140-10143.

Wang, Chungang et al., "Synthesis, Assembly, and Biofunctionalization of Silica-Coated Gold Nanorods for Colorimetric Biosensing," Advanced Functional Materials, vol. 16, No. 13, 2006, pp. 1673-1678.

Wang, Chungang et al., "Gold Nanorod/$Fe_3O_4$ Nanoparticle "Nano-Pearl-Necklaces" for Simultaneous Targeting, Dual-Mode Imaging, and Photothermal Ablation of Cancer Cells," Angewandte Chemie International Edition, vol. 48, No. 15, 2009, pp. 2759-2763.

Wang, Feng et al., "Anisotropic Overgrowth of Metal Heterostructures Induced by a Site-Selective Silica Coating," Angewandte Chemie International Edition, vol. 52, No. 39, 2013, pp. 10344-10348.

Wang, Yun, "Synthesis of Aligned ZnO Nanorods with Different Parameters and their Effects on the Humidity Sensing Property," Abstract, WordPress, Jun. 19, 2010, 2 pages, https://yunwang.wordpress.com/2010/06/19/synthesis-of-aligned-zno-nanorods-with-different-parameters-and-their-effects-on-the-humidity-sensing-property/.

Wu, Wei-Chen et al., "Large-Scale Silica Overcoating of Gold Nanorods with Tunable Shell Thicknesses," Chemistry of Materials, vol. 27, No. 8, Feb. 26, 2015, 14 pages.

Kennedy, W. Joshua et al., "High-Resolution Mapping of Thermal History in Polymer Nanocomposites: Gold Nanorods as Microscale Temperature Sensors," ACS Applied Materials and Interfaces, vol. 7, 2015, pp. 27624-27631.

* cited by examiner

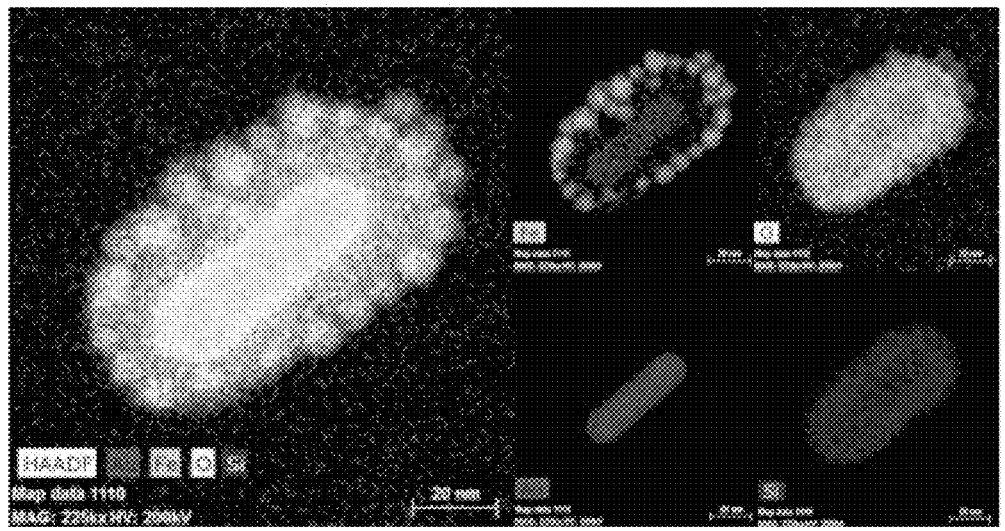
FIG. 18
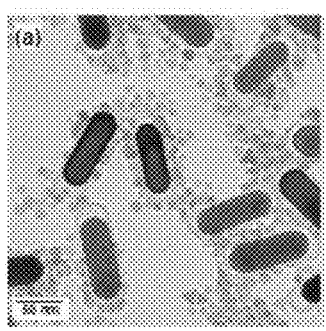 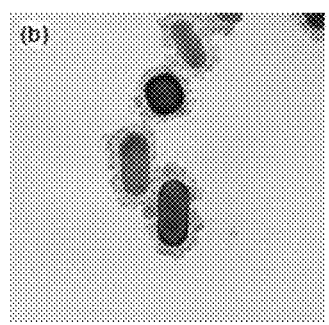 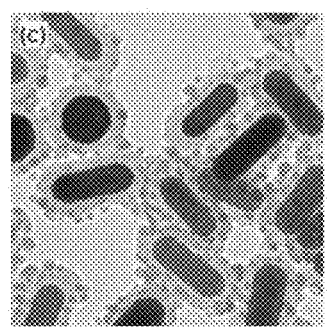
FIG. 19A     FIG. 19B     FIG. 19C

METHOD FOR SYNTHESIZING NON-SPHERICAL NANOSTRUCTURES

RELATED APPLICATIONS

This application claims the benefit of U.S. Provisional Patent Application Ser. No. 62/158,887, filed May 8, 2015, the disclosure of which is hereby incorporated herein by reference in its entirety.

GOVERNMENT SUPPORT

This invention was made with government support under grant number HL111968 awarded by the National Institutes of Health and grant numbers 1056653 and 1121107 awarded by the National Science Foundation. The government has certain rights to this invention.

FIELD OF THE DISCLOSURE

The present disclosure relates to the synthesis of non-spherical nanostructures, and in particular, to a method of synthesizing non-spherical nanostructures that include a silica coating.

BACKGROUND

Nanoparticles containing gold are nanometer-scale structures that exhibit a phenomenon known as surface plasmon resonance (SPR), which makes nanoparticles containing gold particularly useful in a broad array of applications. The broad array of applications, include but is not limited to optical sensing, photothermal destruction of tumor cells, targeted drug delivery, imaging, photonics, and electronics. In some instances, nanoparticles containing gold are gold alloys that include other metals such as copper, silver, palladium, and platinum.

Bare nanoparticles containing gold have a tendency to agglomerate in solution. Uncontrollable agglomeration of gold nanoparticles is undesirable because interaction between closely grouped gold nanoparticles substantially alters the optical properties of the gold nanoparticles, making them unreliable for optical sensing applications. It is known that providing an overcoating of a passivation material such as silica inhibits coalescence of gold nanoparticle cores. For biomedical applications, it is desirable for gold nanoparticles to have an overcoating of a passivation material that is nontoxic and that provides functionalized areas to which molecules of interest can adhere.

The overcoating of a non-spherical nanoparticle containing gold with silica yields a non-spherical nanostructure. At present, the production of non-spherical nanostructures containing gold results in inefficient yields due to a relatively high amount of byproduct material that must be removed before the non-spherical nanostructures are usable for applications. What is needed is a method for synthesizing non-spherical nanostructures that have coatings suitable for applications such as optical sensing.

SUMMARY

The disclosure relates to methods of synthesizing non-spherical nanostructures. In one embodiment, the steps include providing a solution of nanoparticles (NPs) wherein each of the NPs comprises a non-spherical NP that includes gold and a surfactant coating covering the non-spherical NP; mixing the NPs and a pH modifier solution to provide a pH-modified solution of NPs having a pH within a predefined pH range; and adding a silica precursor solution to the solution of nanoparticles at a constant rate for at least one (1) minute to provide a homogeneous silica solution of NPs. In other embodiments, adding the silica precursor solution to the solution of nanoparticles is conducted at a constant rate for at least 2, 3, 4, or 5 minutes to provide the homogeneous silica solution of NPs.

In another embodiment, the steps include providing a solution of nanoparticles (NPs) wherein each of the NPs comprises a non-spherical NP that includes gold and a surfactant coating covering the non-spherical NP; and adding a silica precursor solution to the solution of nanoparticles at a constant rate for at least one (1), 2, 3, 4, or 5 minutes to provide a homogeneous silica solution of NPs.

The method may also include maintaining the homogeneous silica deposition solution of NPs at a temperature that is between 25° C. and 40° C. for a predetermined reaction time to achieve a solution of silica-coated NPs. Other embodiments include adding a deposition stop solution to the homogeneous silica solution to terminate deposition of silica on the silica-coated NPs before the predetermined reaction time is reached to provide each of the silica-coated NPs with a silica coating thickness that is less than 10 nanometers (nm) thick. In at least one embodiment, the deposition stop solution is also used to finely control an average of maximum diameters of bulbous opposing ends comprising dumbbell-shaped silica-coated NPs. In yet another embodiment, a further step adds iron oxide NPs to form a particulate coating onto the silica-coated NPs. The step of adding the iron oxide particulate coating does not involve adding a linker to bind the iron oxide NPs to the silica-coated NPs.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 10A:
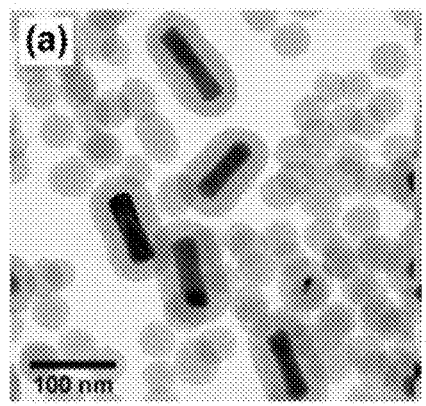
FIG. 10A is a TEM image of $SiO_2$-GNRs synthesized on the 10 mL scale under a non-optimal condition of additional spherical $SiO_2$ NPs when excess cetyltrimethylammonium bromide (CTAB) is present in the solution.
Figure 10B:
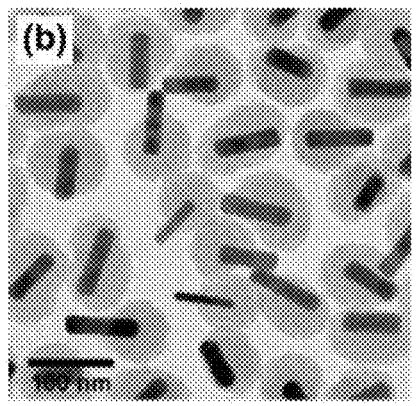
FIG. 10B is a TEM image of $SiO_2$-GNRs synthesized on the 10 mL scale under a non-optimal condition of irregular shells when a large volume (1000 µL) of 20% v/v TEOS solution is used.
Figure 10C:
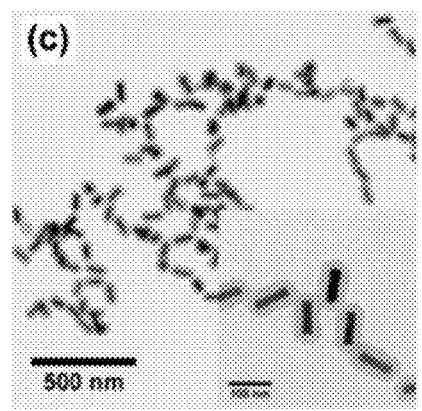
FIG. 10C is a TEM image of $SiO_2$-GNRs synthesized on the 10 mL scale under a non-optimal condition of crosslinking, when the duration of the reaction is too long (5 days, after injecting 500 µL of 20% v/v TEOS solution).
Figure 10D:
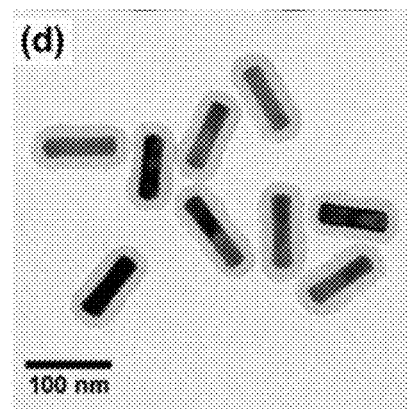

FIG. 10D is a TEM image of $SiO_2$-GNRs synthesized on the 10 mL scale under a non-optimal condition of a shorter reaction time (10 hour, rather than the standard 20 hour) when 500 µL of 20% v/v TEOS solution was injected, which gave a reduced shell thickness of 14.2±2.0 nm rather than 17.3±2.6 nm.

Figure 11:
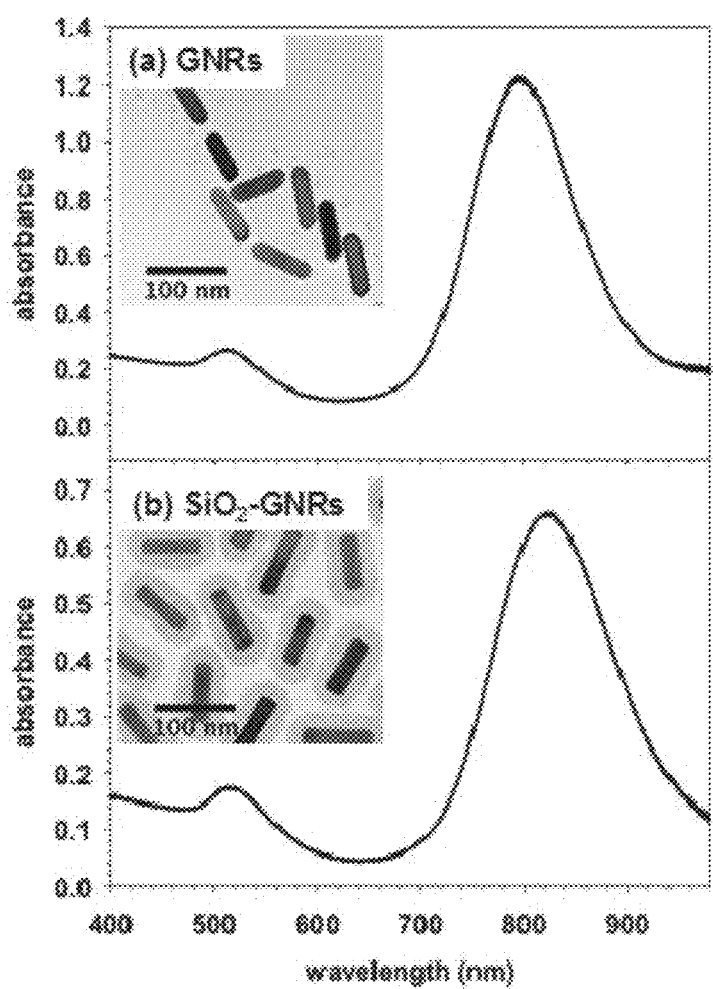

FIG. 11 shows the TEM image and optical absorbance spectra of (a) untreated CTAB-GNRs and (b) $SiO_2$-GNRs.

Figure 12A:
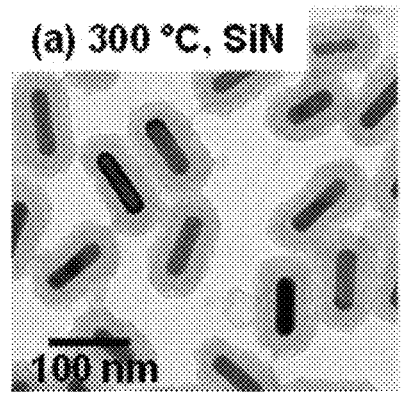

FIG. 12A shows the TEM image of $SiO_2$-GNRs on SiN after heating for 1 hour in air at 300° C.

Figure 12B:
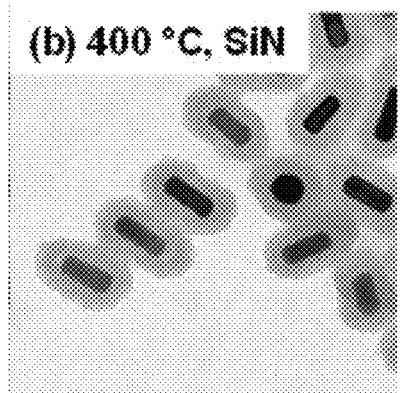

FIG. 12B shows the TEM image of $SiO_2$-GNRs on SiN after heating for 1 hour in air at 400° C.

Figure 12C:
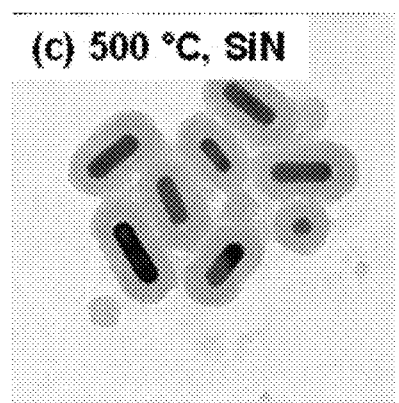

FIG. 12C shows the TEM image of $SiO_2$-GNRs on SiN after heating for 1 hour in air at 500° C.

Figure 12D:
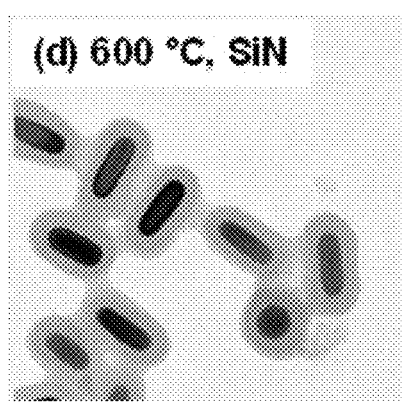

FIG. 12D shows the TEM image of $SiO_2$-GNRs on SiN after heating for 1 hour in air at 600° C.

Figure 12E:
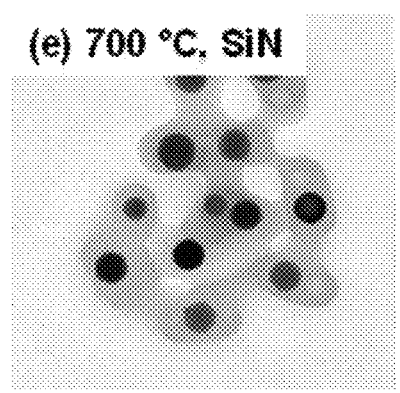

FIG. 12E shows the TEM image of $SiO_2$-GNRs on SiN after heating for 1 hour in air at 700° C.

Figure 12F:
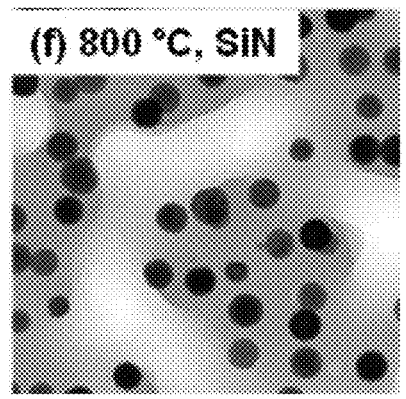

FIG. 12F shows the TEM image of $SiO_2$-GNRs on SiN after heating for 1 hour in air at 800° C.

Figure 13A:
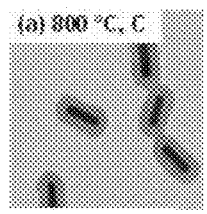

FIG. 13A is a TEM image showing the effects of in situ heating of $SiO_2$-GNRs on a carbon e-chip at 800° C.

Figure 13B:
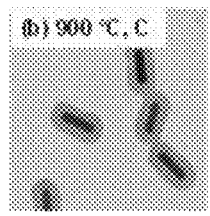

FIG. 13B is a TEM image showing the effects of in situ heating of $SiO_2$-GNRs on a carbon e-chip at 900° C.

Figure 13C:
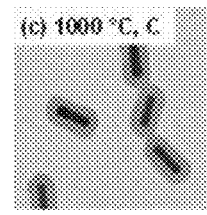

FIG. 13C is a TEM image showing the effects of in situ heating of $SiO_2$-GNRs on a carbon e-chip at 1000° C.

Figure 13D:
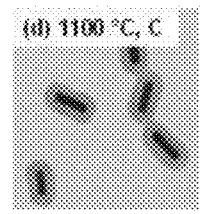

FIG. 13D is a TEM image showing the effects of in situ heating of $SiO_2$-GNRs on a carbon e-chip at 1100° C.

Figure 13E:
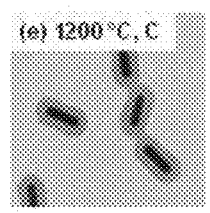

FIG. 13E is a TEM image showing the effects of in situ heating of $SiO_2$-GNRs on a carbon e-chip at 1200° C.

Figure 13F:
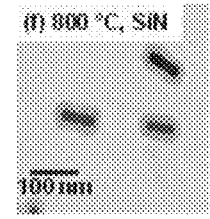

FIG. 13F is a TEM image showing the effects of in situ heating of $SiO_2$-GNRs on a SiN e-chip at 800° C.

Figure 13G:
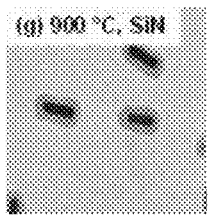

FIG. 13G is a TEM image showing the effects of in situ heating of $SiO_2$-GNRs on a SiN e-chip at 900° C.

Figure 13H:
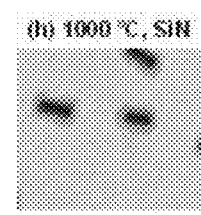

FIG. 13H is a TEM image showing the effects of in situ heating of $SiO_2$-GNRs on a SiN e-chip at 1000° C.

Figure 13I:
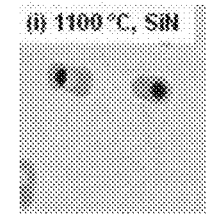

FIG. 13I is a TEM image showing the effects of in situ heating of $SiO_2$-GNRs on a SiN e-chip at 1100° C.

Figure 13J:
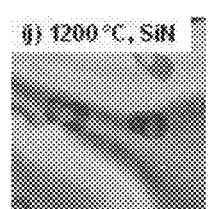

FIG. 13J is a TEM image showing the effects of in situ heating of $SiO_2$-GNRs on a SiN e-chip at 1200° C.

Figure 14:
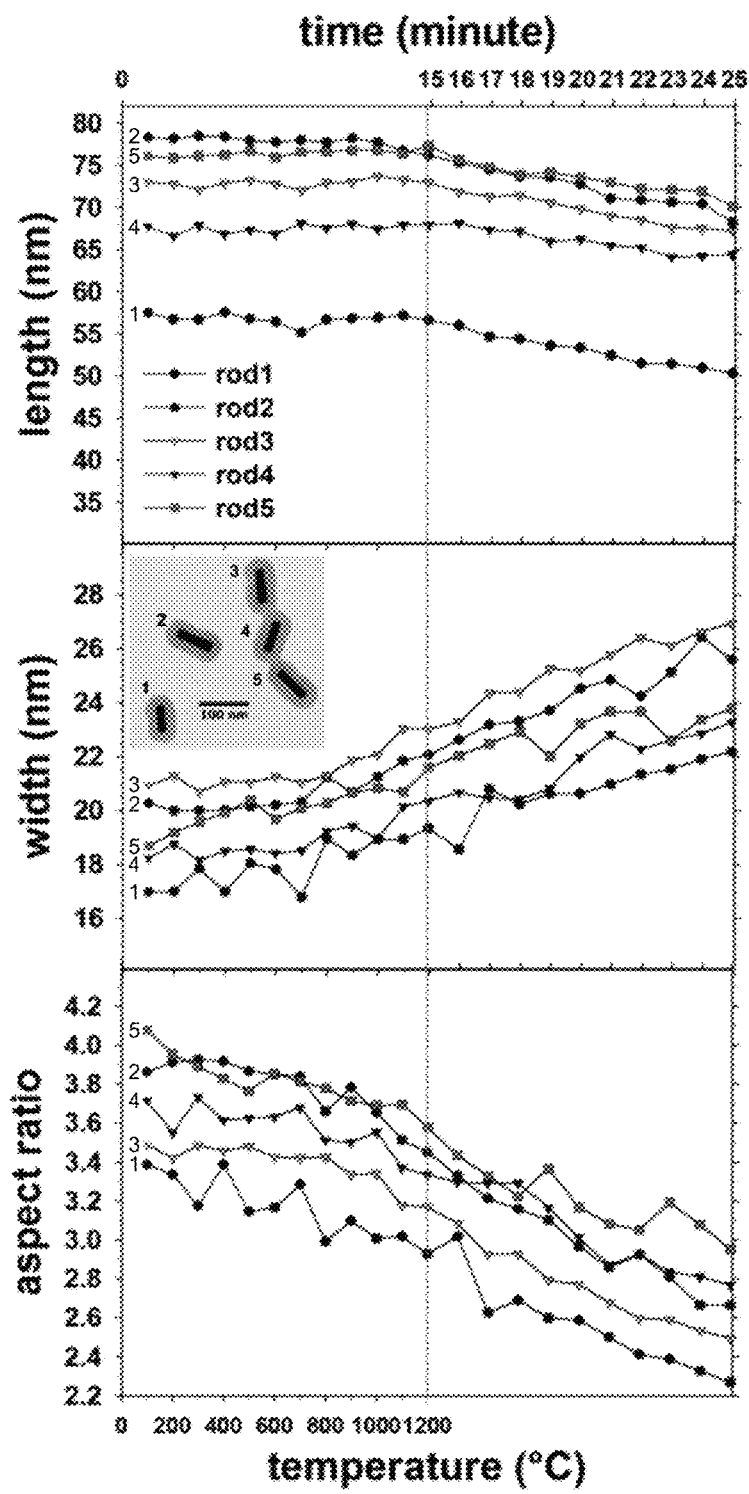

FIG. 14 shows the GNR shape and temperature dependence during heating to 1200° C. and then holding the temperature at 1200° C. for an additional 10 minutes.

Figure 15A:
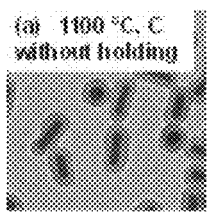

FIG. 15A is a TEM image that shows $SiO_2$-GNRs on carbon e-chip during cooling process from 1200° C. to 1100° C. without holding the temperature for any time.

Figure 15B:
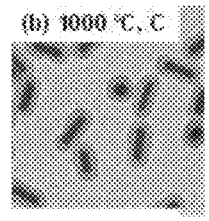

FIG. 15B is a TEM image that shows $SiO_2$-GNRs on carbon e-chip during cooling process from 1200° C. to 1000° C. without holding the temperature for any time.

Figure 15C:
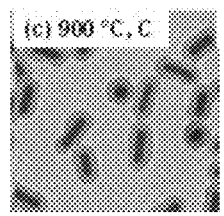

FIG. 15C is a TEM image that shows $SiO_2$-GNRs on carbon e-chip during cooling process from 1200° C. to 900° C. without holding the temperature for any time.

Figure 15D:
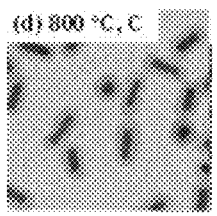

FIG. 15D is a TEM image that shows $SiO_2$-GNRs on carbon e-chip during cooling process from 1200° C. to 800° C. without holding the temperature for any time.

Figure 15E:
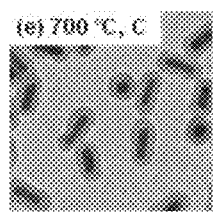

FIG. 15E is a TEM image that shows $SiO_2$-GNRs on carbon e-chip during cooling process from 1200° C. to 700° C. without holding the temperature for any time.

Figure 15F:
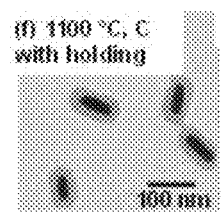

FIG. 15F is a TEM image that shows $SiO_2$-GNRs on carbon e-chip during cooling process from 1200° C. to 1100° C. with holding at 1200° C. for 10 minutes.

Figure 15G:
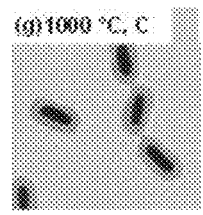

FIG. 15G is a TEM image that shows $SiO_2$-GNRs on carbon e-chip during cooling process from 1200° C. to 1000° C. with holding at 1200° C. for 10 minutes.

Figure 15H:
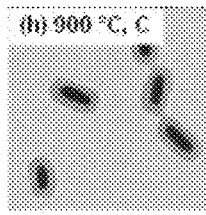

FIG. 15H is a TEM image that shows $SiO_2$-GNRs on carbon e-chip during cooling process from 1200° C. to 900° C. with holding at 1200° C. for 10 minutes.

Figure 15I:
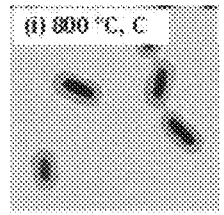

FIG. 15I is a TEM image that shows SiO$_2$-GNRs on carbon e-chip during cooling process from 1200° C. to 800° C. with holding at 1200° C. for 10 minutes.

Figure 15J:
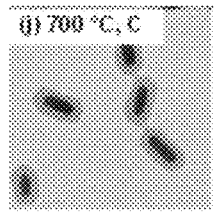

FIG. 15J is a TEM image that shows SiO$_2$-GNRs on carbon e-chip during cooling process from 1200° C. to 700° C. with holding at 1200° C. for 10 minutes.

Figure 16A:
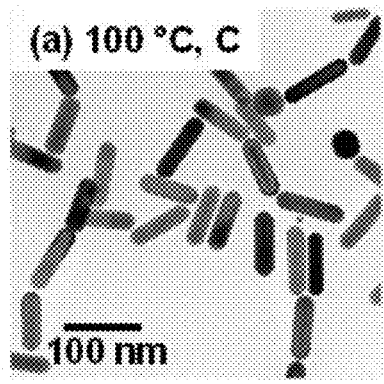

FIG. 16A is a TEM image of uncoated GNRs supported on carbon for TEM after heating for 1 hour in air at 100° C.

Figure 16B:
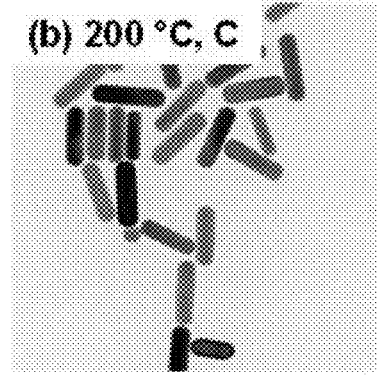

FIG. 16B is a TEM image of uncoated GNRs supported on carbon for TEM after heating for 1 hour in air at 200° C.

Figure 16C:
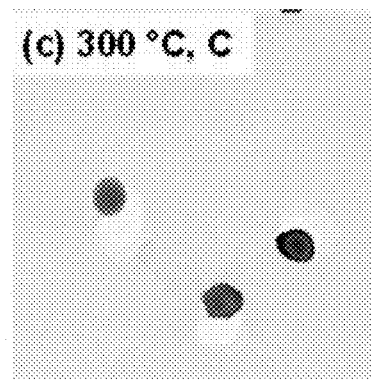

FIG. 16C is a TEM image of uncoated GNRs supported on carbon for TEM after heating for 1 hour in air at 300° C.

Figure 16D:
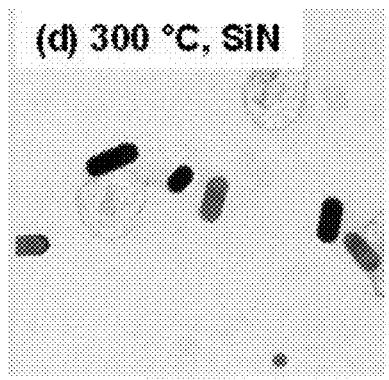

FIG. 16D is a TEM image of uncoated GNRs supported on an SiN substrate for TEM after heating for 1 hour in air at 300° C.

Figure 16E:
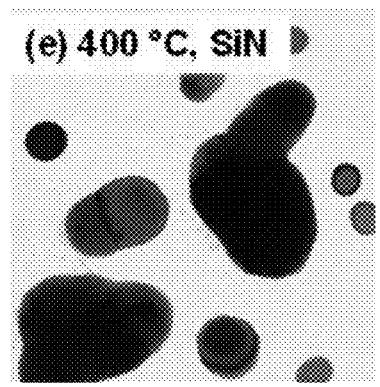

FIG. 16E is a TEM image of uncoated GNRs supported on an SiN substrate for TEM after heating for 1 hour in air at 400° C.

Figure 17A:
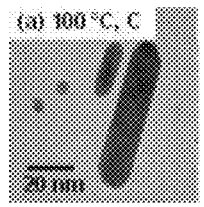

FIG. 17A shows the in situ heating of uncoated GNRs on carbon for TEM at 100° C.

Figure 17B:
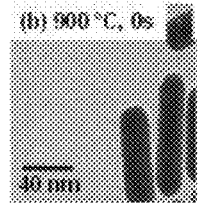

FIG. 17B shows the in situ heating of uncoated GNRs on carbon for TEM at 900° C. at 0 seconds.

Figure 17C:
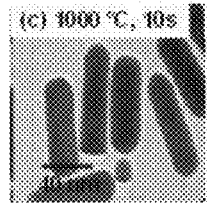

FIG. 17C shows the in situ heating of uncoated GNRs on carbon for TEM at 1000° C. at 10 seconds.

Figure 17D:
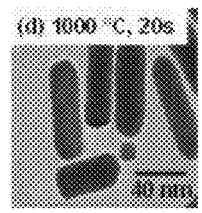

FIG. 17D shows the in situ heating of uncoated GNRs on carbon for TEM at 1000° C. at 20 seconds.

Figure 17E:
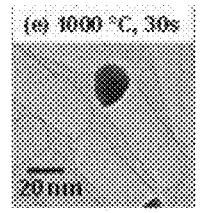

FIG. 17E shows the in situ heating of uncoated GNRs on carbon for TEM at 1000° C. at 30 seconds.

Figure 17F:
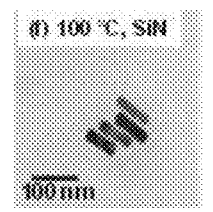

FIG. 17F shows the in situ heating of uncoated GNRs on SiN substrates for TEM at 100° C. at 0 seconds.

Figure 17G:
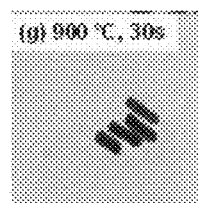

FIG. 17G shows the in situ heating of uncoated GNRs on SiN substrates for TEM at 900° C. at 30 seconds.

Figure 17H:
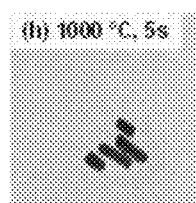

FIG. 17H shows the in situ heating of uncoated GNRs on SiN substrates for TEM at 1000° C. at 5 seconds.

Figure 17I:
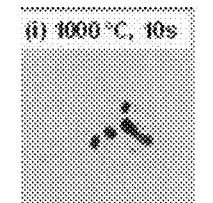

FIG. 17I shows the in situ heating of uncoated GNRs on SiN substrates for TEM at 1000° C. at 10 seconds.

Figure 17J:
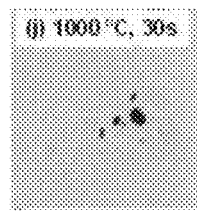

FIG. 17J shows the in situ heating of uncoated GNRs on SiN substrates for TEM at 1000° C. at 30 seconds.

FIG. 18 depicts scanning transmission electron microscope energy-dispersive X-ray spectroscopy (STEM-EDS) mapping of a single Fe$_3$O$_4$—SiO$_2$-GNR.

FIG. 19A shows a TEM image of Fe$_3$O$_4$-overcoated PEG-SiO$_2$-GNRs with an SiO$_2$ shell thickness of 2 nm.

FIG. 19B shows a TEM image of Fe$_3$O$_4$-overcoated PEG-SiO$_2$-GNRs with an SiO$_2$ shell thickness of 7 nm.

FIG. 19C shows a TEM image of Fe$_3$O$_4$-overcoated PEG-SiO$_2$-GNRs with an SiO$_2$ shell thickness of 10 nm.

Figure 20A:

FIG. 20A is a photograph showing attraction of Fe$_3$O$_4$—SiO$_2$-GNRs to a permanent magnet.

Figure 20B:
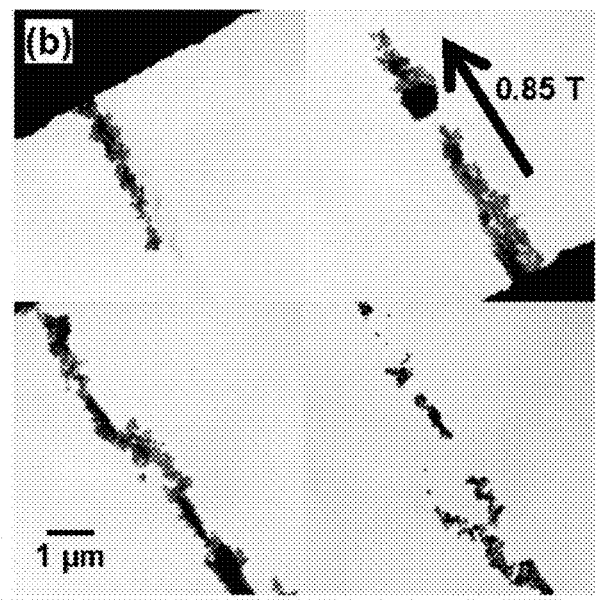

FIG. 20B shows TEM images of Fe$_3$O$_4$—SiO$_2$-GNRs assembled in a homogeneous magnetic field (0.85 T).

Figure 21:
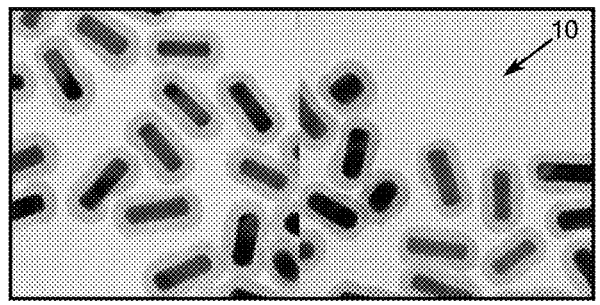

FIG. 21 shows a TEM image of a concentrated dispersion of SiO$_2$ GNRs in methanol (MeOH).

Figure 22:
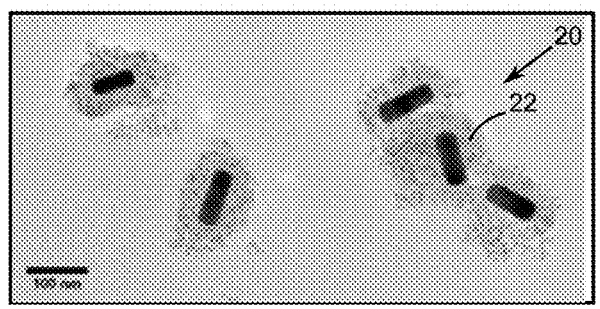

FIG. 22 is a TEM image of a solution that comprises Fe$_3$O$_4$-overcoated SiO$_2$-GNRs.

Figure 23:
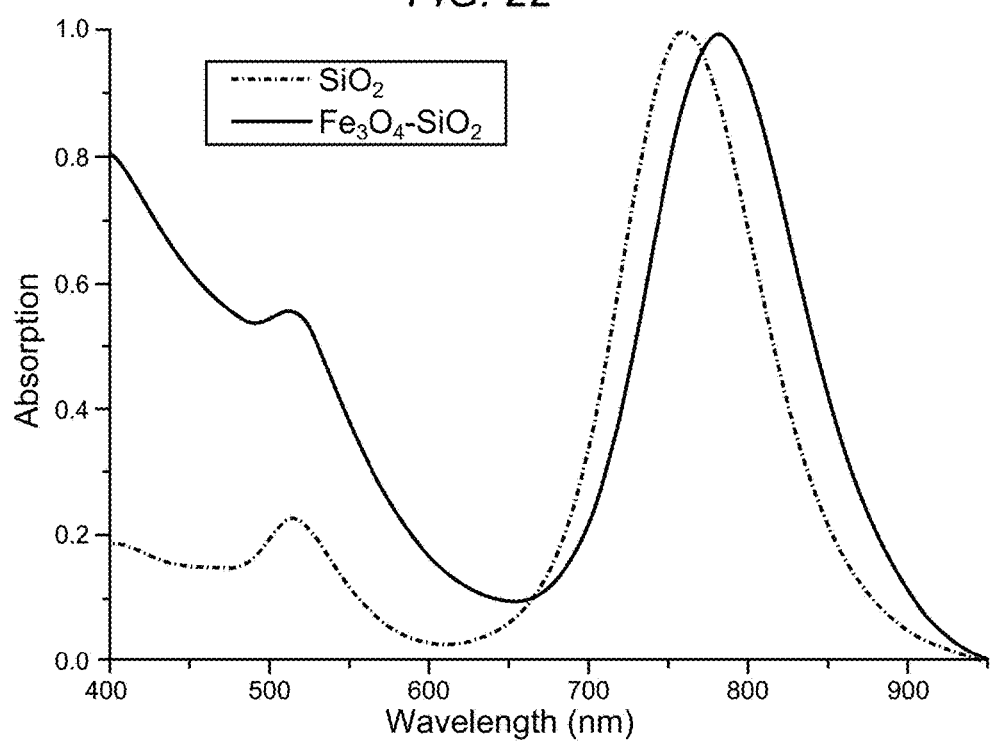

FIG. 23 is a graph of normalized optical absorption spectra of SiO$_2$-GNRs before and after Fe$_3$O$_4$ overcoating.

Figure 24:
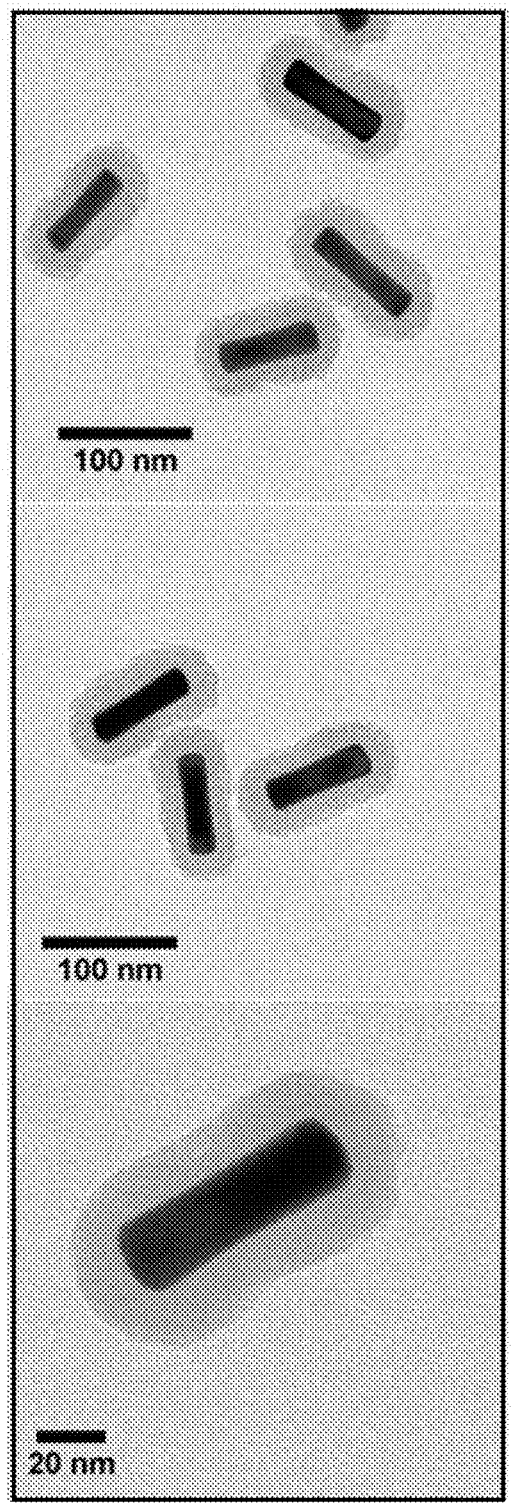

FIG. 24 shows SiO$_2$-GNRs that were synthesized using 100% v/v TEOS.

Figure 25A:
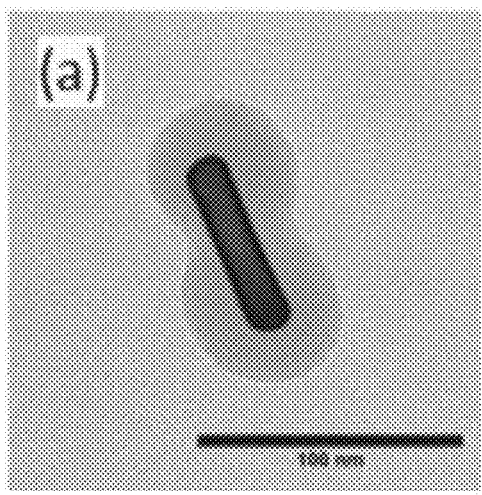

FIG. 25A shows results of a 5 times concentrated GNR to which a 5 v/v % TEOS in MeOH solution was added.

Figure 25B:
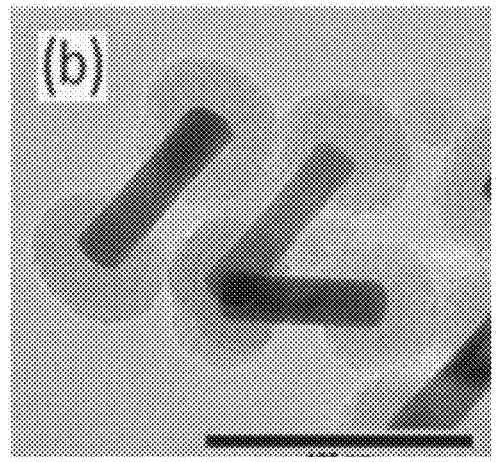

FIG. 25B shows a 10 times concentrated GNR to which a 5 v/v % TEOS in MeOH solution was added.

Figure 25C:
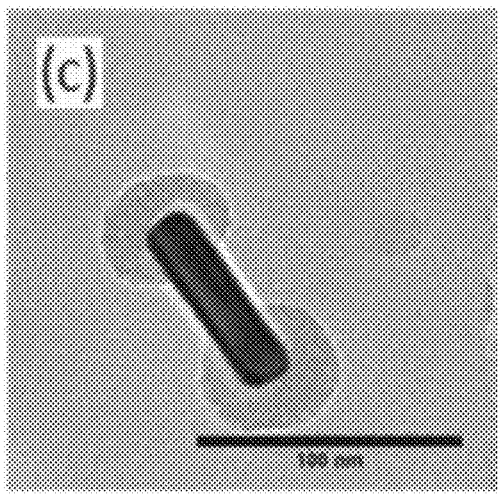

FIG. 25C shows a 15 times concentrated GNR to which a 5 v/v % TEOS in MeOH solution was added, wherein the lobes are smaller compared to the lobes of FIG. 25B.

Figure 25D:
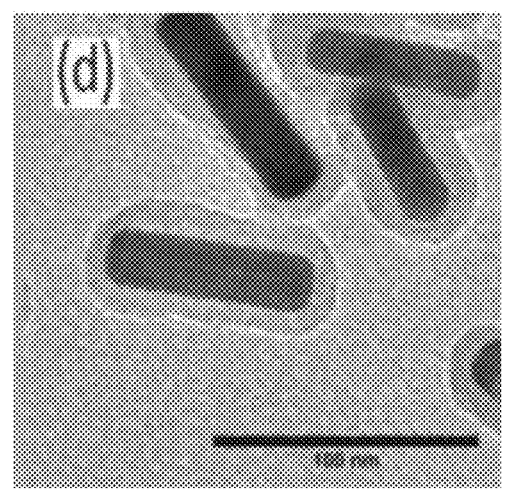

FIG. 25D shows a 20 times concentrated GNR to which a 5 v/v % TEOS in MeOH solution was added.

Figure 26A:
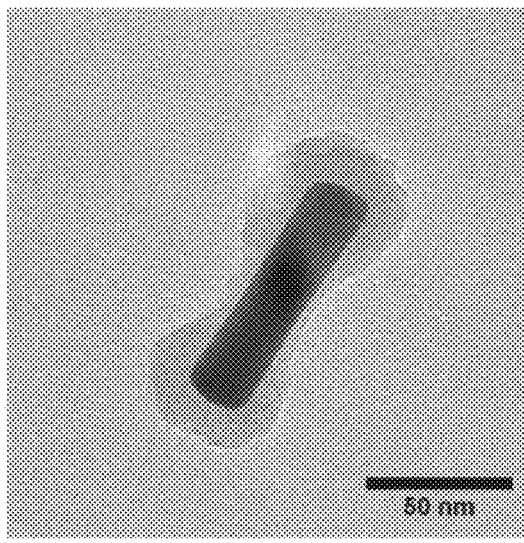

FIG. 26A shows a single dumbbell-shaped nanostructure having a relatively thin waist diameter.

Figure 26B:
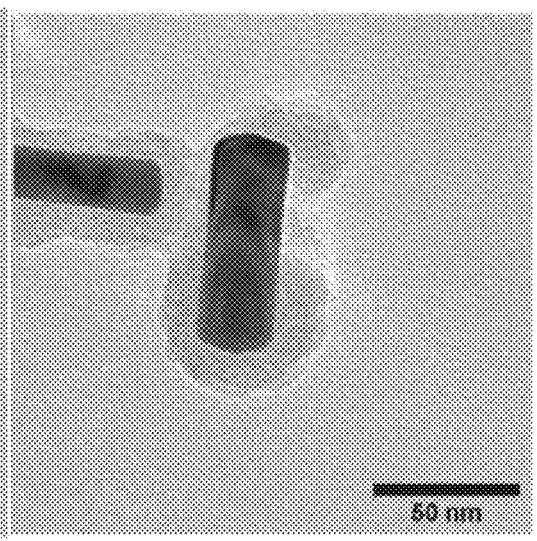

FIG. 26B appears to show some crosslinking between a pair of nanostructures.

Figure 26C:
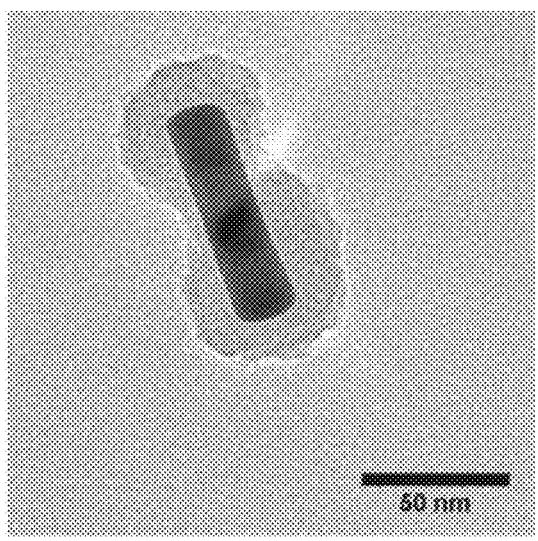

FIG. 26C shows a dumbbell-shaped nanostructure having a relatively thicker waist in comparison to the dumbbell-shaped nanostructure of FIG. 26A.

Figure 26D:
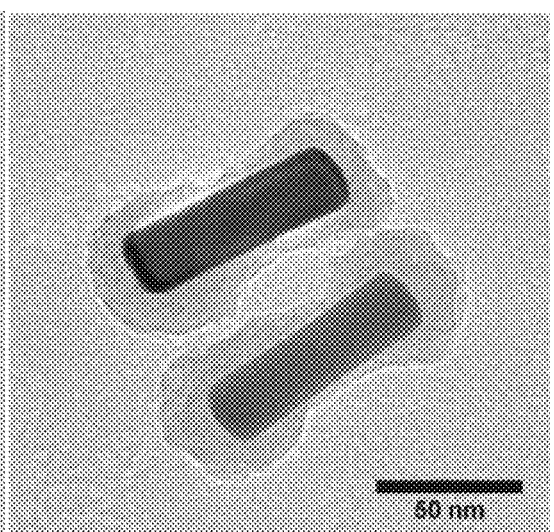

FIG. 26D shows that the lobes of the dumbbell-shaped nanostructures provide separation of adjacent nanorods.

Figure 27A:
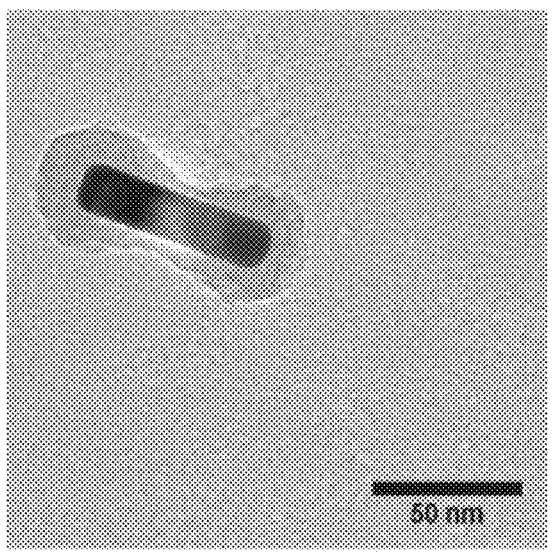

FIG. 27A shows a dumbbell-shaped nanostructure with a relatively rougher outer surface.

Figure 27B:
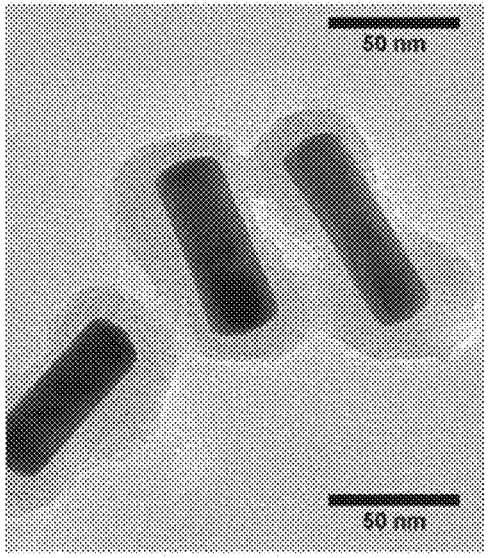

FIG. 27B provides an example of some crosslinking between three dumbbell-shaped nanostructures.

Figure 27C:
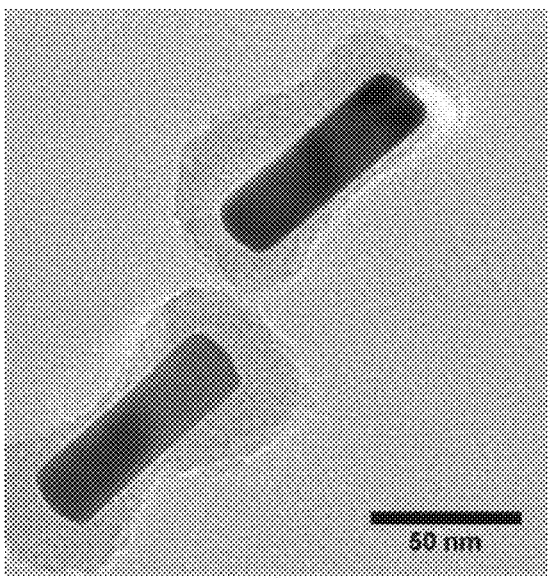

FIG. 27C shows dumbbell-shaped nanostructures having some angular lobe features.

Figure 27D:
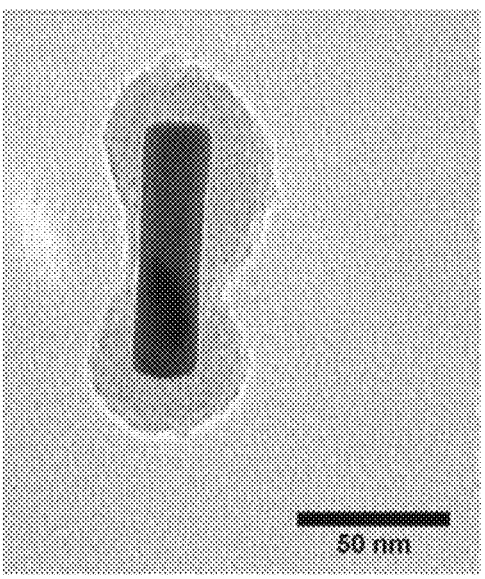

FIG. 27D shows another dumbbell-shaped nanostructure.

Figure 28:
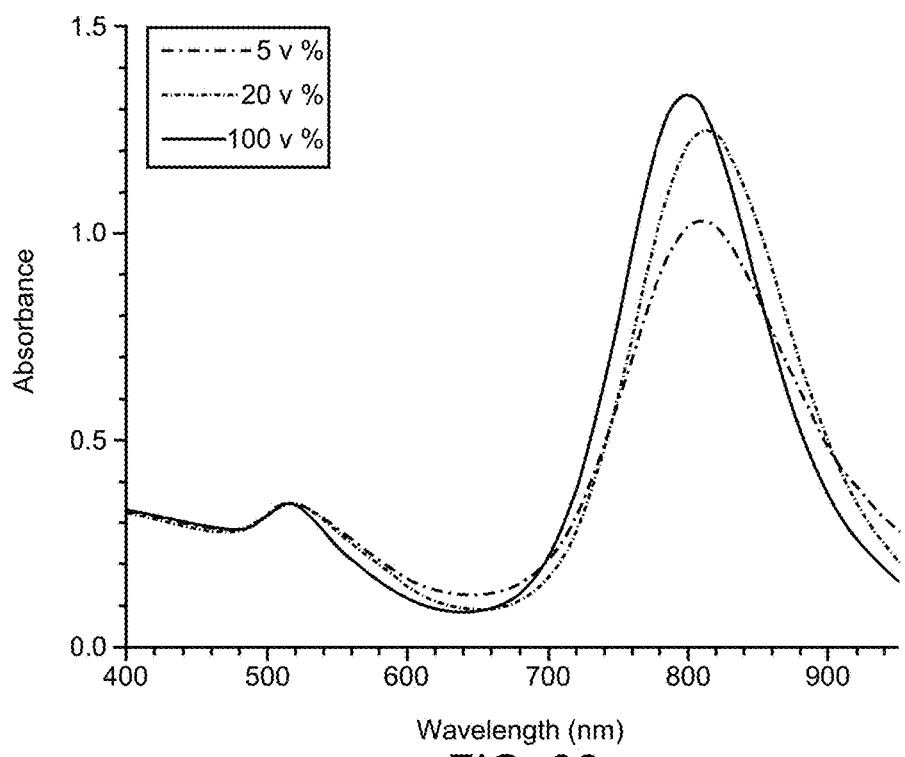

FIG. 28 is a graph of optical absorbance versus wavelength of silica-coated GNRs synthesized from varying concentrations of TEOS (v %) in MeOH.

Figure 29:
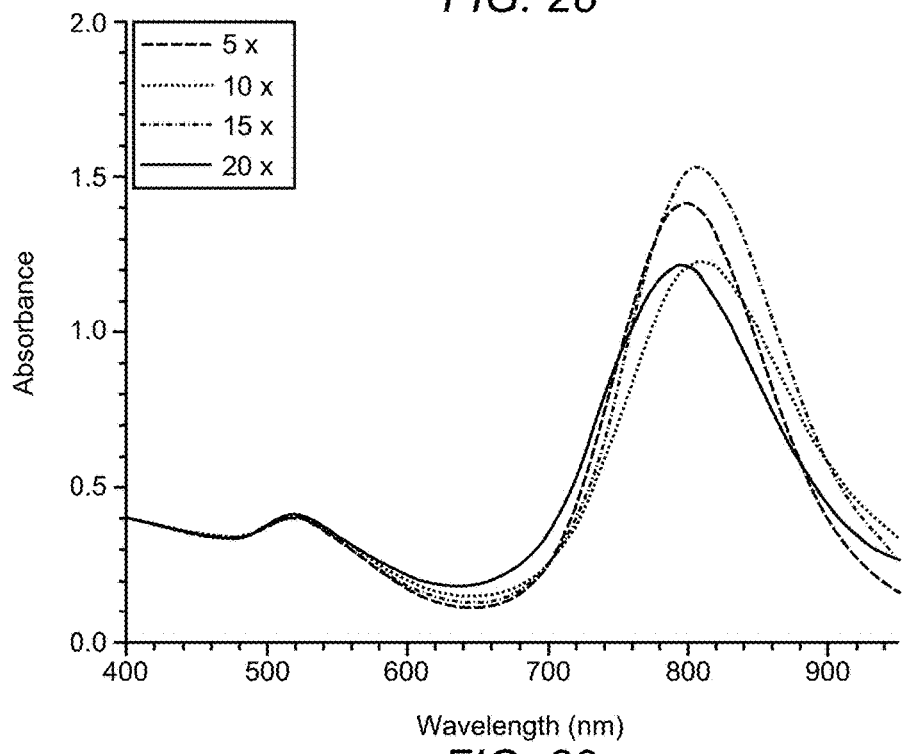

FIG. 29 is a graph of absorbance spectra versus wavelength for silica-coated GNRs synthesized using GNR solutions of different concentrations.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The descriptions and examples set forth herein are not intended to limit the scope of the disclosure. The claimed subject matter may be embodied in other ways, as is contemplated by the inventors. Further, the disclosure contemplates that other methods may include different steps or elements that are similar in scope to those described herein and may employ other presently available or future technologies.

Figure 1A:
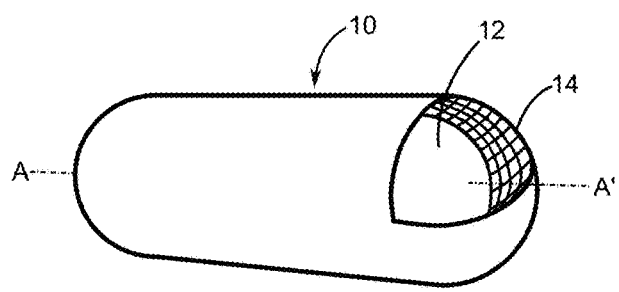
FIG. 1A is a perspective view of a non-spherical nanostructure with an open section showing a nanoparticle (NP) that is encapsulated by a SiO$_2$ shell in accordance with the present disclosure.

FIG. 1A is a perspective view of a non-spherical nanostructure 10 with an open section showing a nanoparticle (NP) 12 that is encapsulated by a $SiO_2$ shell 14 in accordance with the present disclosure. It is to be understood that the term silica refers to silicon dioxide ($SiO_2$) and that the terms silica and $SiO_2$ are used interchangeably throughout the disclosure. It is also to be understood that the term $SiO_2$ includes condensation reactions that are not completely crosslinked or condensed. A longitudinal axis A-A' is depicted to show orientation for cross-sectional views shown in later Figures. While the shape of NP 12 as depicted in FIGS. 1A through 1G is that of a nanorod, it is to be understood that other non-spherical morphologies for NP 12 are within the scope of the present disclosure. Some examples of non-spherical morphologies within the scope of this disclosure include, but are not limited to, triangular, decahedral, cubic, hexagonal, and octahedral shapes. Examples of more complex non-spherical morphologies within the scope of this disclosure include, but are not limited to, nanostars, nanostarfruit, nanocages, nanodogbones and concave nanostructures.

Figure 1B:
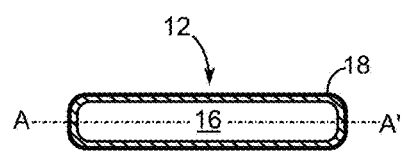
FIG. 1B is a cross-sectional view of the NP comprising a non-spherical NP and a surfactant coating.

FIG. 1B is a cross-sectional view of the NP 12 comprising a non-spherical NP 16 and a surfactant coating 18. In some embodiments, the non-spherical NP 16 is practically 100% gold (Au). In other embodiments, the non-spherical NP 16 is made of an Au alloy, intermetallic, core/shell, or other phase-segregated structure having a percentage of Au composition that is at least 40 atomic %.

The surfactant coating 18 serves as a template for silicate deposition. The use of the surfactant coating 18 stems from limited chemical or electrostatic affinity between $SiO_2$ and the non-spherical NP 16, which causes difficulty in overcoating the non-spherical NP 16 with $SiO_2$ without an adhesion layer in between, especially when the non-spherical NP 16 is made of Au. Therefore, a surfactant (e.g., cationic surfactants) between $SiO_2$ and Au is used to allow silicate deposition and to stabilize pluralities of the non-spherical NP 16 while in suspension. Moreover, the morphology of the surfactant coating 18 on the surface of the non-spherical NP 16 also plays a substantial role in determining the uniformity of $SiO_2$ overcoatings.

Various molecules or polymers that make up the surfactant coating 18 are usable for deposition of $SiO_2$ onto the non-spherical NP 16. Examples of these surfactants include, but are not limited to, polystyrene sulfonate (PSS), poly (allylamine hydrochloride) (PAH), (3-aminopropyl) trimethoxysilane (APS), and cetyltrimethylammonium bromide (CTAB) micelles. Among these surfactants, cationic CTAB is a native stabilizer used to synthesize the non-spherical NP 16. Moreover, CTAB is also usable as a template for $SiO_2$ growth. Therefore, selecting CTAB as the template simplifies deposition of the $SiO_2$ shell 14 over the non-spherical NP 16 because no additional surface modification of the non-spherical NP 16 is needed, and the thickness of the $SiO_2$ shell 14 can be tuned by adjusting the CTAB concentration.

Figure 1C:
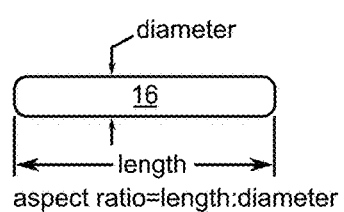
FIG. 1C is a longitudinal view of the non-spherical NP comprising the NP of FIG. 1B.

FIG. 1C is a longitudinal view of the non-spherical NP 16 that comprises the NP 12 depicted in FIGS. 1A through 1G. The non-spherical NP 16 has a length and a diameter that gives an aspect ratio (length:diameter). In some exemplary embodiments, the non-spherical NP 16 is a gold nanorod having a length that is between 50 nanometers (nm) and 100 nm and has an aspect ratio that is between 1.5:1 and 5:1.

Figure 1D:
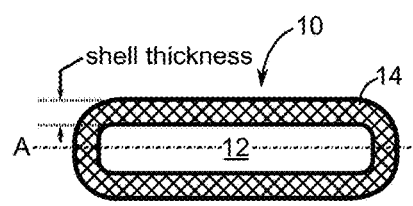
FIG. 1D is a cross-sectional view of the non-spherical nanostructure of FIG. 1A.

FIG. 1D is a cross-sectional view of the non-spherical nanostructure 10 depicted in FIG. 1A. In the cross-sectional view, the uniformity of the $SiO_2$ shell thickness is generally shown for various embodiments of the non-spherical nanostructure 10. In some embodiments, the thickness of the $SiO_2$ shell 14 is between 10 nm and 20 nm. In other embodiments, the thickness of the $SiO_2$ shell 14 is less than 10 nm. For example, in some embodiments, the thickness of the $SiO_2$ shell 14 is between 2 nm and 10 nm.

Figure 1E:
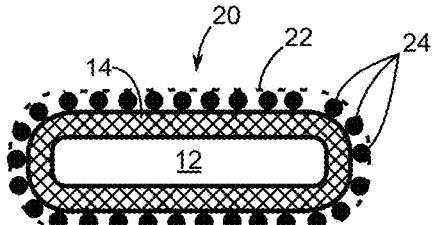
FIG. 1E is a cross-sectional view of the non-spherical nanostructure shown in FIGS. 1A and 1D having an iron oxide particulate coating.

FIG. 1E is a cross-sectional view of a non-spherical nanostructure 20 that is similar to the non-spherical nanostructure 10 shown in FIGS. 1A and 1D. However, the functionalized non-spherical nanostructure 20 is functionalized with an iron oxide particulate coating 22 that is formed over the surface of the $SiO_2$ shell 14. In an exemplary embodiment, the iron oxide particulate coating 22 is made up of iron oxide particles 24. The purpose of the iron oxide particles 24 is to provide magnetic functionalization of the functionalized non-spherical nanostructure 20. In one embodiment, the iron oxide particles 24 are iron (II,III) oxide (magnetite, $Fe_3O_4$) particles. In another embodiment, the iron oxide particles 24 are maghemite, $\gamma$-$Fe_2O_3$) particles. Magnetic functionalization allow for pluralities of the functionalized non-spherical nanostructure 20 to be manipulated and possibly aligned with applied magnetic fields. The iron oxide particulate coating 22 has a further advantage of providing magnetic functionalization without substantially displacing a desirable longitudinal surface plasmon resonance (LSPR) peak associated with the non-spherical NP 16.

Figure 1F:
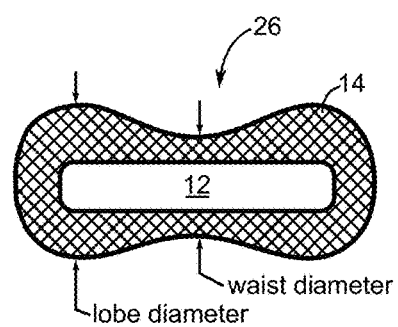
FIG. 1F is a cross-sectional view of another embodiment of a non-spherical nanostructure having a dumbbell-shaped SiO$_2$ shell that fully encapsulates the NP.

FIG. 1F is a cross-sectional view of a non-spherical nanostructure 26 in which the $SiO_2$ shell 14 is dumbbell-shaped and fully encapsulates the NP 12. In this embodiment, the non-spherical nanostructure 26 has a waist diameter that is less than an average of lobe diameters that are the maximum diameters of bulbous opposing ends of the $SiO_2$ shell 14.

Figure 1G:
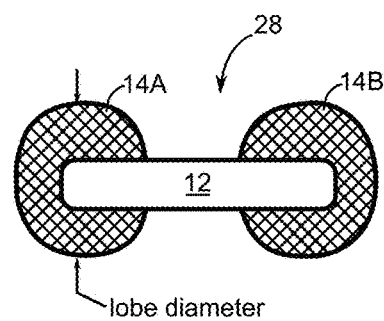
FIG. 1G is a cross-sectional view of another embodiment of a non-spherical nanostructure having a dumbbell shape with a bare waist and SiO$_2$ shell lobes deposited on opposed ends of the NP.

FIG. 1G is a cross-sectional view of another embodiment of a non-spherical nanostructure 28 having a dumbbell shape with a bare waist and $SiO_2$ shell lobes deposited on opposed ends of the NP 12. In this embodiment, a waist diameter is the diameter of the NP 12 because the NP 12 has a bare waist in that the NP 12 is not encapsulated by the $SiO_2$ shell 14. Instead, the non-spherical nanostructure 28 has a first shell portion 14A formed over one opposing end of the NP 12 and a second shell portion 14B formed over another opposing end of the NP 12.

Figure 2:
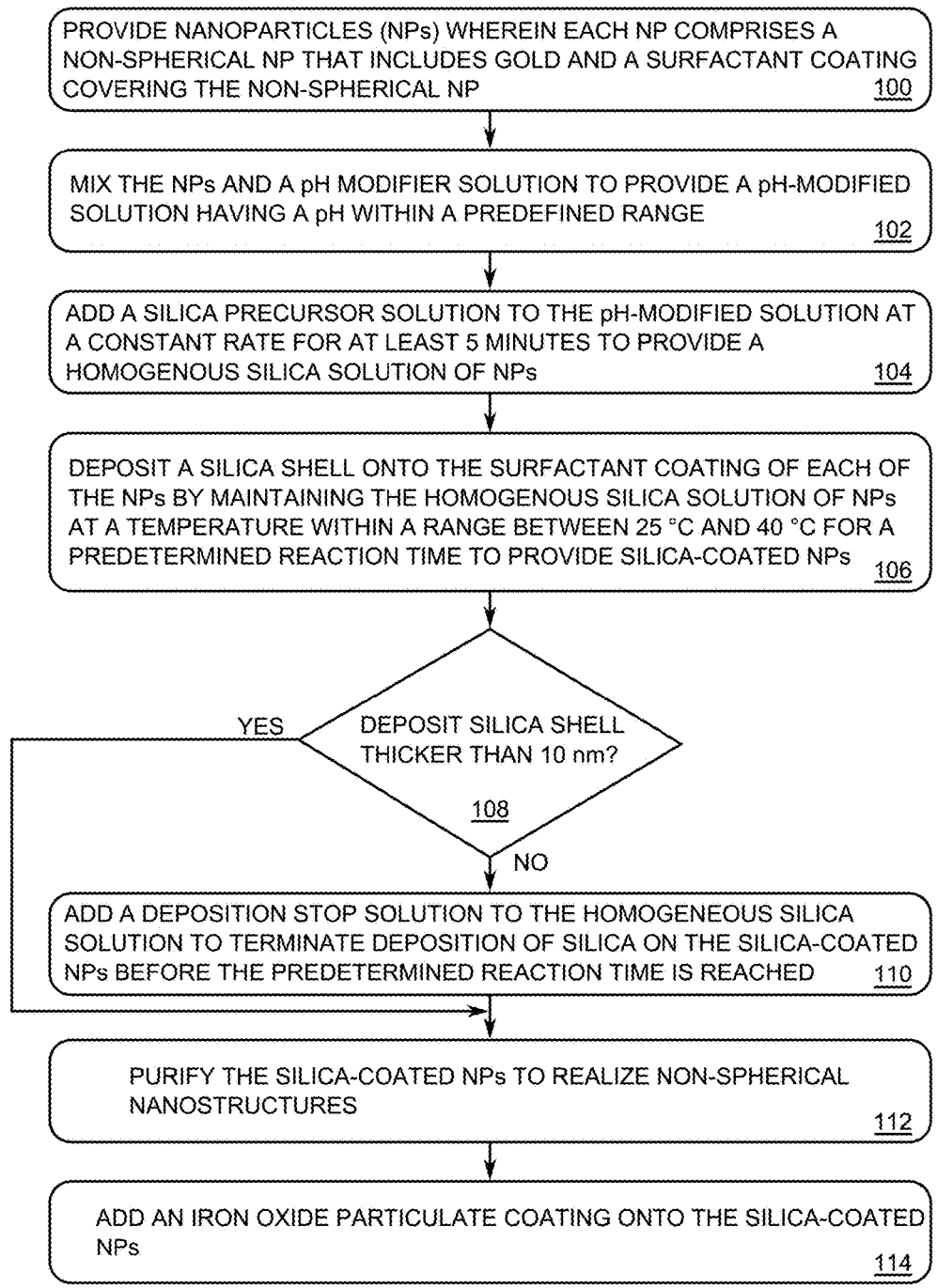
FIG. 2 is a process flow diagram for methods of synthesizing the non-spherical NPs depicted in FIGS. 1A, and 1D through 1G.

FIG. 2 is a process flow diagram for methods of synthesizing the non-spherical nanostructure 10 depicted in FIGS. 1A, and 1D through 1G. A process begins with providing nanoparticles (NPs) such as the NP 12 that comprises the non-spherical NP 16 that includes gold (Au) and a surfactant coating 18 covering the non-spherical NP 16 (step 100). In at least one embodiment, the non-spherical NP 16 is practically 100% Au. In other embodiments, the non-spherical NP 16 is a gold alloy that is at least 40 atomic % gold. Moreover, in at least some embodiments the surfactant coating 18 is CTAB, which has an advantage of being inherent from some NP synthesis processes. In accordance with the present disclosure, uniformity and the thickness of $SiO_2$ shell 14 can be influenced by establishing a predetermined amount of surfactant coating 18, such as CTAB, before a silica deposition step is commenced.

A next step is mixing the NPs 12 and a pH modifier solution to provide a pH-modified solution of NPs having a pH within a predefined range (step 102). An example of a pH modifier solution is 0.1 molar (M) sodium hydroxide (NaOH). Another example of a pH modifier is ammonia ($NH_3$), which is usable in a saturated aqueous form known as ammonium hydroxide ($NH_4OH$). An example of a predefined pH range is 10 to 12. However, it is to be understood that the pH modifier solution needed to obtain a desired pH range will be basic or acidic depending upon the inherent pH of the NPs 12 at step 100.

In this regard, the pH value of the pH modifier solution, which dictates acid or base catalysis, is an important factor in determining the final $SiO_2$ structure of the $SiO_2$ shell 14. At a pH below the isoelectric point of $SiO_2$ (IEP=2.0), the silica species become positively charged, and the charge density increases as the pH decreases. When the pH is above the IEP of silica, the silica species become negatively charged (silicates), and the charge density of silicates increases as pH increases. For 2<pH<7, negatively charged silicates can assemble with positively charged surfactants via electrostatic and hydrogen-bonding interactions. For pH greater than 7, silicates with high negative charge densities can only assemble with the cationic surfactants through strong electrostatic interactions. For formation of $SiO_2$ nano/microstructures using template methods 10<pH<12 is desirable to prevent dissolution of silicate because of the strong electrostatic interactions in silicate-cationic surfactant composites.

A following step involves adding a silica precursor to the pH-modified solution of NPs at a constant rate for at least 1, 2, 3, 4, or 5 minutes (min) to provide a homogeneous silica solution of non-spherical NPs 16 (step 104). For the purpose of this disclosure a constant rate is defined as a substantially fixed rate that is within ±5% of a predetermined rate. An exemplary constant rate is between about 6 µL/min and 100 µL/min. Another exemplary constant rate is between 100 µL/min and 250 µL/min. It is to be understood that especially at low injection rates, a syringe pump can push the plunger of the syringe at a constant rate, but the solution can be dispensed from the needle in discrete drops.

Regarding precursors, metal alkoxides ($M^+RO^-$) are the most preferred type of precursor for a colloidal solution (sol) that acts as a precursor for an integrated network (gel) (sol-gel) process because metal alkoxides easily react with water. Silanes are another class of reactants. For example, chlorosilanes like $SiCl_4$ and related silanes are not alkoxides, but they are expected to be usable for depositing the $SiO_2$ of the present disclosure. Tetramethoxysilane (TMOS) and tetraethoxysilane (TEOS) are common $SiO_2$ precursors. The silica source, catalyst, $H_2O$/Si molar ratio, reactant concentration, pH, temperature and reaction time are all important levers in sol-gel synthesis of $SiO_2$. In sol-gel chemistry, hydrolysis can occur without use of a catalyst, but the catalyst accelerates the reaction. The molar ratio of the $H_2O$ to Si affects the rate of hydrolysis; a higher value of this ratio usually results in a higher hydrolysis rate. However, the lower silicate concentration for high $H_2O$/Si molar ratios results in longer gelation time. In addition to the above factors, alcohol is often used to facilitate the reaction because water and some alkoxides are immiscible.

Once the silica precursor is added, a next step is depositing the $SiO_2$ shell 14 onto the surfactant coating 18 of each of the NPs 12 by maintaining the homogeneous silica solution of non-spherical NPs 16 at a temperature that is between 25° C. and 40° C. for a predetermined reaction time to provide silica-coated NPs (step 106). The predetermined reaction time is generally between 1 hour and 30 hours. However, in one embodiment the predetermined reaction time is between 19 hours and 21 hours. In yet another embodiment, the predetermined reaction time is 20 hours±5 minutes.

Within the predetermined reaction time, a decision is made as to whether or not to allow the $SiO_2$ shell 14 to grow thicker than 10 nm (step 108). If the decision is yes, then the predetermined reaction time is uninterrupted. Alternatively, if the answer is no then the predetermined reaction time is interrupted by adding a deposition stop solution to the homogeneous silica solution before the predetermined reaction time is reached (step 110). Poly(ethylene glycol) silane (PEG-silane), where a silane is functionalized with one (or multiple) poly(ethylene glycol) chains, is an exemplary deposition stop solution. For example, the addition of the deposition stop solution PEG-silane at different times during an overcoating reaction allows facile control over the shell thickness. Shell thicknesses as thin as 2 nm can be realized for the $SiO_2$ shell 14 due to bulky PEG chains that terminate further crosslinking and deposition of $SiO_2$.

Once a desired thickness for the $SiO_2$ shell 14 is achieved, a next step involves purifying the silica-coated NPs to realize non-spherical nanostructures 10 (step 112). In an exemplary embodiment, methanol is added to the non-spherical nanostructures 10, and centrifugation is used to separate the non-spherical nanostructures 10 from a resulting supernatant. This exemplary purification procedure can be repeated until a desired purity of the non-spherical nanostructures 10 is achieved.

Once purified, the non-spherical nanostructures 10 are ready to be functionalized. This step involves adding the iron oxide particulate coating 22 (FIG. 1E) onto the non-spherical nanostructures 10 to realize functionalized non-spherical nanostructures 20 (step 114). In one embodiment, the iron oxide particulate coating 22 is iron (II,III) oxide (magnetite, $Fe_3O_4$). In another embodiment, the iron oxide particulate coating 22 is maghemite ($\gamma$-$Fe_2O_3$).

In one embodiment, a concentrated dispersion of the non-spherical nanostructures 10 in tetrahydrofuran (THF) or methanol (MeOH) is injected into a dispersion of $Fe_3O_4$ NPs in hexanes, toluene, or THF and mixed thoroughly. The $Fe_3O_4$ NPs include hydrophobic ligands that facilitate their deposition onto the non-spherical nanostructures 10. Ethanol is added to the solution, forcing the $Fe_3O_4$ NPs to precipitate onto the surface of the non-spherical nanostructures 10 to realize the functionalized non-spherical nanostructures 20. The solution is centrifuged at around 4,000 rpm for around five (5) minutes to yield a precipitate of the functionalized non-spherical nanostructures 20 and a supernatant. The supernatant is removed and the precipitate is dispersed in hexanes, toluene, or THF to provide a solution comprising the functionalized non-spherical nanostructures 20 having the iron oxide particulate coating 22. The functionalized non-spherical nanostructures 20 are sedimented using a magnetic field from a permanent magnet. The resulting supernatant is removed, and the functionalized non-spherical nanostructures 20 having the iron oxide particulate coating 22 are dispersed in hexanes, toluene, or THF to be stored until further functionalization or use in an application, such as a biomedical application.

The remainder of the disclosure provides detailed examples for synthesis, functionalization, and characterization of silica-coated gold nanorod ($SiO_2$-GNR) embodiments of the non-spherical nanostructures 10. $SiO_2$-GNRs are of interest for numerous applications, especially for biomedical applications because of their surface plasmon resonance. Application of external magnetic fields can direct the motion or assembly of magnetic NPs. There are few reports, however, of incorporating magnetic materials onto the surface of GNRs. A significant challenge for some approaches of magnetic overcoating is the high temperature that is often required for deposition of magnetic materials. Because GNRs are temperature sensitive, GNRs can be first overcoated with a thermally stable $SiO_2$ shell, which can also serve as an adhesion layer for further deposition of $Fe_3O_4$ as an outer shell. Results for the assembly of $Fe_3O_4$-overcoated GNRs in applied magnetic fields are also disclosed.

Example 1: Materials and Methods for Producing $SiO_2$-GNRs

Chemicals

CTAB (Sigma-Aldrich, 99%, H6269), KBr (Alfa Aesar, ACS, 99% min), $AgNO_3$ (Alfa Aesar, 99.9995%), $HAuCl_4.xH_2O$ (Alfa Aesar, 99.999%, where x was estimated as 3), deionized water (Ricca, ACS Reagent grade, ASTM Type I, ASTM Type II), ascorbic acid (AA, J. T. Baker, 99.5%), and $NaBH_4$ (Sigma-Aldrich, 99%, 213462) were used in the GNR synthesis. TEOS (Alfa Aesar, 99.9%), NaOH (Sigma-Aldrich 98%), 2-[methoxy(polyethyleneoxy)9-12propyl]trimethoxysilane (PEG-silane, Gelest, 90%), and anhydrous methanol (EMD, DriSolv) were used for the $SiO_2$ overcoating. Methanol (Macron, UltimAR) was used for purification of $SiO_2$-GNRs and PEG-functionalized $SiO_2$-GNRs (PEG-$SiO_2$-GNRs).

Gold Nanorod Synthesis and Purification

CTAB-stabilized GNRs are synthesized according to a method described in U.S. Pat. No. 9,314,849, which is hereby incorporated herein by reference in its entirety, resulting in a 1 L aqueous solution containing approximately 190 mg of GNRs with average dimensions of 77×21 nm, which have an LSPR of approximately 800 nm. Obtaining an optimal concentration of CTAB after purification is critical, not only for stabilizing GNRs against aggregation before $SiO_2$ overcoating, but also for depositing uniform $SiO_2$ coatings while avoiding formation of spherical $SiO_2$ NPs that do not encapsulate GNRs. A GNR stock solution has a CTAB concentration of 0.1 M. Two cycles of centrifugation (Thermo Scientific Sorvall Legend X1R with Fiberlite F15-6×100y fixed-angle rotor), each at 10,000 g for 20 min, were performed at 30° C. to avoid crystallization of CTAB while concentrating the GNRs and removing excess CTAB. The GNR stock solution is fractionated into volumes of 60 mL for each centrifuge tube.

After the first centrifugation cycle, ~58 mL of the nearly colorless supernatant is removed from each tube by pipetting. Deionized water is added to bring the volume of solution in each centrifuge tube to 60 mL. Therefore, this 30× dilution step gives a final CTAB concentration of 3.3 mM, while the GNRs have the same concentration as in the stock solution. After centrifuging a second time, ~58 mL of the supernatant containing CTAB is removed, and the remaining 2 mL of GNR solution is collected from each tube. The 2 mL product is then diluted to 6 mL by adding 4 mL of deionized water, giving a final CTAB concentration of 1.1 mM and an effective 10× increase in the concentration of GNRs, as compared with the stock solution before purification. Fractions of this purified GNR solution from multiple centrifuge tubes are combined as needed to provide more material for $SiO_2$ overcoating making up a $SiO_2$ shells such as the $SiO_2$ shell 14 depicted in FIGS. 1A, and 1D through 1G.

Silica Overcoating Reaction on Standard 10 mL Scale

Reactions are conducted in a temperature-controlled water bath at 30° C. A solution of 0.1 M NaOH is prepared in deionized water, and TEOS is diluted in anhydrous methanol, giving a 20% v/v TEOS solution. Unless noted otherwise, reactions are conducted on the following 10 mL, standard scale. For the synthesis of $SiO_2$-GNRs (or PEG-$SiO_2$-GNRs that are $SiO_2$ shells less than 10 nm), 0.1 M NaOH is added dropwise to 10 mL of the purified GNR solution (containing ~19 mg of GNRs and 1.1 mM CTAB) in 20 mL scintillation vials, while quickly stirring with a magnetic stir bar (octagonal with pivot ring, 5/16" diameter, ½" long). The pH is adjusted to 10-10.4. A variable amount (31.3-500 μL) of the TEOS solution (20% v/v) is loaded into a syringe and injected into the pH-adjusted aqueous solution of GNRs by syringe pump over a period of 5 minutes. The solution is gently stirred (70 rpm) for 30 min and is then kept unstirred in the water bath for another 20 h. The product contains $SiO_2$-GNRs with uniform $SiO_2$ shells, whose thickness could be adjusted between 3 and 20 nm by varying the volume of TEOS solution. For improved control of ultrathin $SiO_2$ overcoatings (<10 nm thick), 40 μL of neat PEG-silane is added at different times (30 minutes to 2 hours) after completing injection of TEOS solution, which caused early termination of the shell growth reaction. For all PEG-silane addition times, the reaction mixture is stirred for 30 minutes after adding the PEG-silane and is then allowed to sit in the water bath for 20 h without stirring.

Large-Scale Synthesis of $SiO_2$-GNRs and PEG-$SiO_2$-GNRs

The overcoating reaction can be scaled up from 10-fold to a 100 mL, large-scale using approximately 190 mg of GNRs, which are obtained from 1 L (before purification and concentration) of the CTAB-stabilized GNR solution. The reactant concentrations, pH, temperature, and predetermined timing are kept the same as for the standard scale. In at least one embodiment, the amounts of TEOS solution (20% v/v) and PEG-silane are multiplied by a factor of 10, and the TEOS solution is injected over a period of five (5) minutes. For the large-scale synthesis, the PEG-silane is added dropwise or at a constant rate, and the reaction is conducted in 125 mL Erlenmeyer flasks using a longer magnetic stir bar (octagonal with pivot ring, 5/16" diameter, 2" long).

Purification

In each centrifuge tube, 2 mL of the as-synthesized $SiO_2$-GNR (or PEG-$SiO_2$-GNR) solution is diluted with methanol to a total volume of 40 mL. Five centrifugation cycles (IEC Centra-MP4 with IEC 854 4×50 fixed-angle rotor), each at 8500 g for 10 minutes and at room temperature, are required to remove reaction byproducts. After each cycle, the supernatant is removed, leaving approximately 1 mL of SiO$_2$-GNR (or PEG-SiO$_2$-GNR) solution, which is then diluted with methanol to a total volume of 40 mL before starting the next cycle. After the last cycle, the approximately 1 mL of the product in each centrifuge tube is combined with the other fractions for storage without further dilution.

Characterization

Transmission electron microscopy (TEM) is performed using a JEOL 2000FX microscope operated at 200 kV to examine the GNR core and SiO$_2$ shell morphologies and to measure the average SiO$_2$ shell thickness from samples of 100 NPs. Optical absorbance spectra are acquired using an Ocean Optics CHEMUSB4-VIS-NIR spectrophotometer. Absorbance spectra for SiO$_2$-GNRs and PEG-SiO$_2$-GNRs are normalized to the spectrum for the uncoated GNRs at 400 nm.

SiO$_2$-GNR Synthesis

Figure 3A:
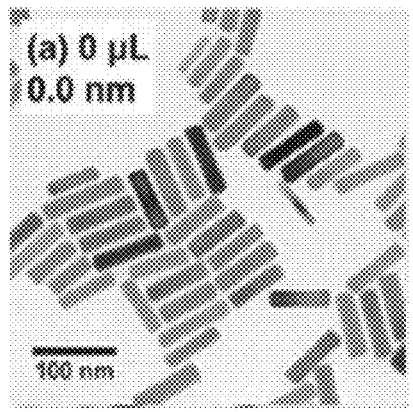
FIG. 3A shows a transmission electron microscope (TEM) image of uncoated gold nanorods (GNRs).

Use of a syringe pump automates addition of TEOS and allows for improved control over the reaction, as compared with adding the TEOS solution all at once or in smaller increments. FIG. 3A depicts GNRs without SiO$_2$ shells. Under properly optimized conditions, the CTAB coatings template deposition of porous SiO$_2$ shells onto the GNRs (FIG. 3B-3F). The porous structure of the SiO$_2$ shells is apparent in the TEM images. The SiO$_2$ shell thickness is adjusted (3.3-17.3 nm) by varying the volume of TEOS solution added (31.3-500 µL), while maintaining the same reaction time and conditions (FIG. 4, inset (g)). The CTAB coatings remain between the GNR cores and SiO$_2$ shells but do not appear as lighter corona in TEM images, because TEM images include contrast from segments of the SiO$_2$ shell that cover the CTAB layer in the out-of-plane direction above and below the widest part of the GNR.

Figure 3B:
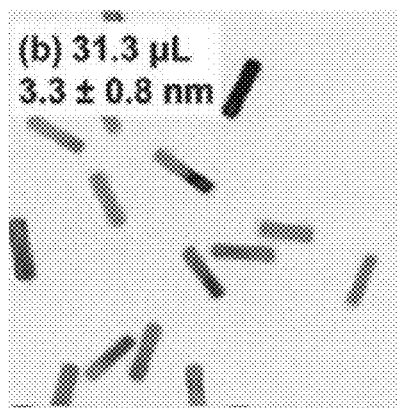
FIG. 3B shows a TEM image of $SiO_2$-GNRs synthesized on a 10 mL scale using a 31.3 µL volume of 20% v/v tetraethyl orthosilicate (TEOS) solution resulting in a 3.3 nm $SiO_2$ shell thickness.
Figure 3C:
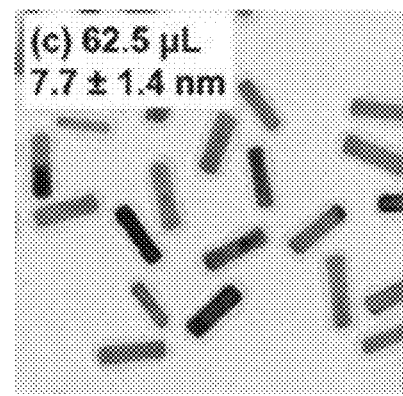
FIG. 3C shows a TEM image of $SiO_2$-GNRs synthesized on a 10 mL scale using a 62.5 µL volume of 20% v/v TEOS solution resulting in a 7.7 nm $SiO_2$ shell thickness.

For the samples prepared using 31.3-250 µL of the 20% TEOS solution with shell thicknesses of 3.3-16.0 nm (FIG. 3B-3E), the SiO$_2$ shell volume ($V_{SiO2}$) has a linear dependence on the volume of 20% TEOS solution ($V_{TEOS}$): $V_{SiO2} = aV_{TEOS} + b$, where $a = 0.84 \times 10^3$ nm$^3$/µL and $b = 5.7 \times 10^3$ nm$^3$ (FIG. 4(h)). The intercept term, b, is quite close to zero and corresponds to a shell thickness of 0.9 nm. The linear trend among these data points indicates that the yield of the reaction for the conversion of TEOS into SiO$_2$ is similar for these samples. In contrast, the data point for the sample that used 500 µL of the 20% TEOS solution with a shell thickness of 17.3 nm (FIG. 3F) lies far below the trendline as seen in FIG. 4, inset (h), which indicates a significantly lower yield. Without being bound to any particular theory, a reaction time greater than 20 hours is envisioned to complete the reaction when using this larger amount of TEOS.

The following calculations indicate that most of the TEOS solution is consumed and deposited onto the GNRs during the reaction. Based on the size of the GNRs, their concentration, and the SiO$_2$ shell volume (calculated from TEM measurements of the shell thickness and treating the GNRs and SiO$_2$-GNRs as concentric cylinders), the density of the SiO$_2$ shells can be calculated, assuming 100% yield. If the actual yield is close to 100%, then the calculated value will agree with known values for the density of porous SiO$_2$ (1.3-2.1 g/cm$^3$). Furthermore, the density of fused SiO$_2$ at 2.2 g/cm$^3$ may be a reasonable upper limit because it is both amorphous and nonporous; porosity would cause a decrease in the density. Since a substantially lower actual yield would give thinner shells, the resulting calculated density would exceed the maximum reference value of the density for porous SiO$_2$.

Figure 3D:
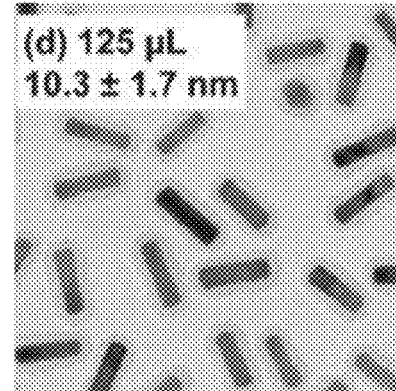
FIG. 3D shows a TEM image of $SiO_2$-GNRs synthesized on a 10 mL scale using a 125 µL volume of 20% v/v TEOS solution resulting in a 10.3 nm $SiO_2$ shell thickness.
Figure 3E:
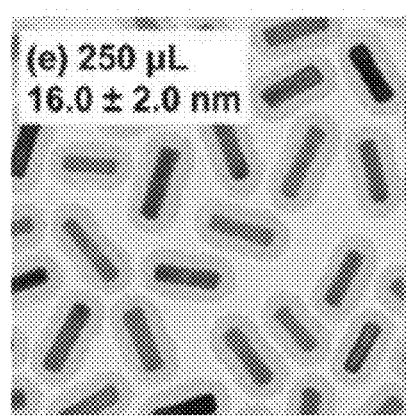
FIG. 3E shows a TEM image of $SiO_2$-GNRs synthesized on a 10 mL scale using a 250 µL volume of 20% v/v TEOS solution resulting in a 16.0 nm $SiO_2$ shell thickness.
Figure 3F:
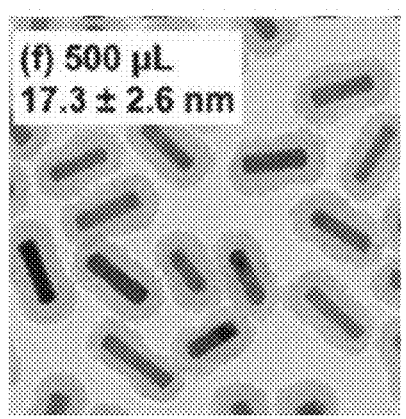
FIG. 3F shows a TEM image of $SiO_2$-GNRs synthesized on a 10 mL scale using a 500 µL volume of 20% v/v TEOS solution resulting in a 17.3 nm $SiO_2$ shell thickness.
Figure 4:
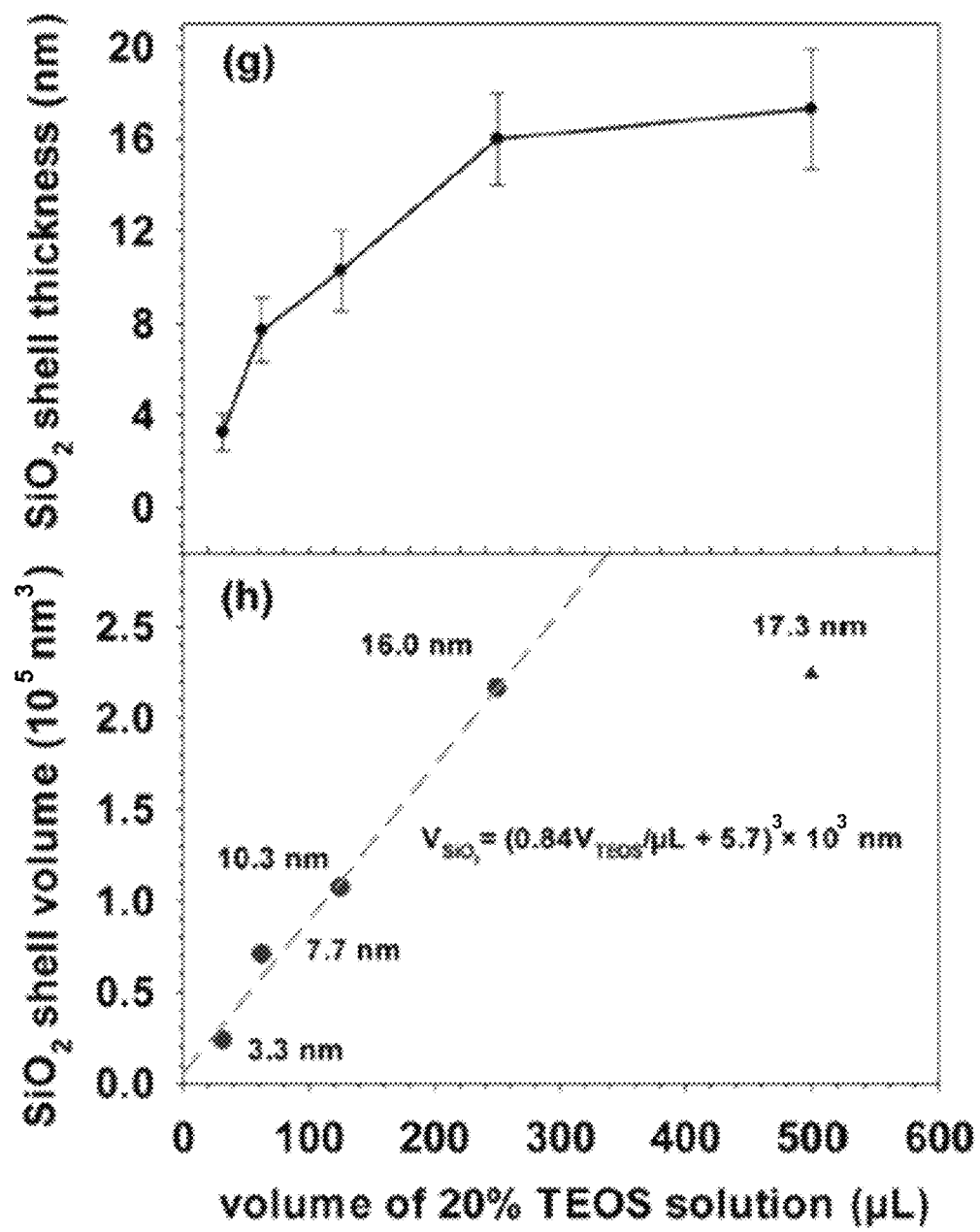
FIG. 4 depicts plots of the $SiO_2$ shell (g) thickness and (h) volume (calculated for concentric cylinders) as a function of the volume of TEOS solution.

In the example set forth in FIG. 3D, the sample prepared using 125 µL of the 20% TEOS solution had a SiO$_2$ shell thickness of 10.3 nm. Dividing this amount of TEOS by the number of GNRs in the solution gives $1.9 \times 10^6$ molecules of TEOS per GNR. If each TEOS molecule is converted into one unit of SiO$_2$ in the shell, the mass of SiO$_2$ units ($1.9 \times 10^{-16}$ g) divided by the volume of the shell ($1.1 \times 10^5$ nm$^3$) gives a density of 1.7 g/cm$^3$, which is in the range of values for porous SiO$_2$. Therefore, the reaction may go at least mostly and possibly entirely to completion. The wide range of reference values for the density of porous SiO$_2$ does not allow for the unambiguous conclusion that the reaction goes entirely to completion. Similar densities are also calculated for the other samples that used 31.3 µL (2.0 g/cm$^3$), 62.5 µL (1.3 g/cm$^3$), or 250 µL (1.7 g/cm$^3$) of the 20% TEOS solution (FIGS. 3B, 3C, and 3E). For the sample prepared using 500 µL of the 20% TEOS solution with a SiO$_2$ shell thickness of 17.3 nm, however, a density of 3.0 g/cm$^3$ is calculated, but the TEM image in FIG. 3F shows a porous shell structure. This suggests (in agreement with the discussion of the SiO$_2$ shell volume) the reaction did not go as far to completion as for the other samples.

Effect and Importance of CTAB Concentration

The CTAB coating on GNRs templates deposition of SiO$_2$. A large excess of CTAB is used in the synthesis of GNRs. For example, the CTAB:HAuCl$_4$ molar ratio is 98:1. After purifying the GNRs, the final CTAB concentration is 1.1 mM, which is close to the critical micelle concentration (CMC) of CTAB in water (0.9 mM). The absence of additional spherical SiO$_2$ NPs that do not encapsulate GNRs is consistent with removal of most of the excess CTAB that is used in the GNR synthesis, as shown in FIG. 3B-3F. In the presence of a substantial excess of CTAB, empty CTAB micelles would also template deposition of SiO$_2$ as shown in FIG. 10A. A CTAB concentration slightly exceeding the CMC has been chosen because a concentration below the CMC would likely alter the structure of the CTAB layer on GNRs and destabilize them in solution or cause formation of nonuniform SiO$_2$ shells. Centrifugation is performed after the overcoating reaction to remove the excess SiO$_2$ particles. The free CTAB is also reduced to minimize the number of empty CTAB micelles in the solution, while still having enough CTAB to stabilize the GNRs in the solution. The methanol in which the TEOS is diluted also perturbs the CTAB layer on the GNRs, giving nonuniform SiO$_2$ overcoatings, as described later.

PEG-SiO$_2$-GNR Synthesis

Figure 5A:
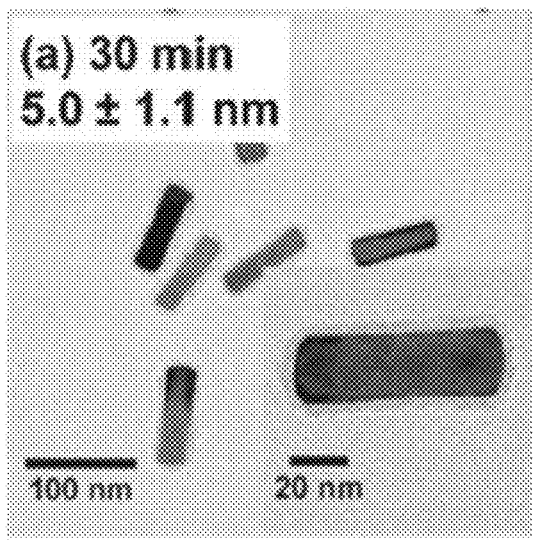
FIG. 5A shows a TEM image for PEG-functionalized $SiO_2$-GNRs (PEG-$SiO_2$-GNRs) synthesized on the 10 mL scale by adding PEG-silane at 30 minutes after adding 125 µL of 20% v/v TEOS solution resulting in a 5 nm $SiO_2$ shell thickness.
Figure 5B:
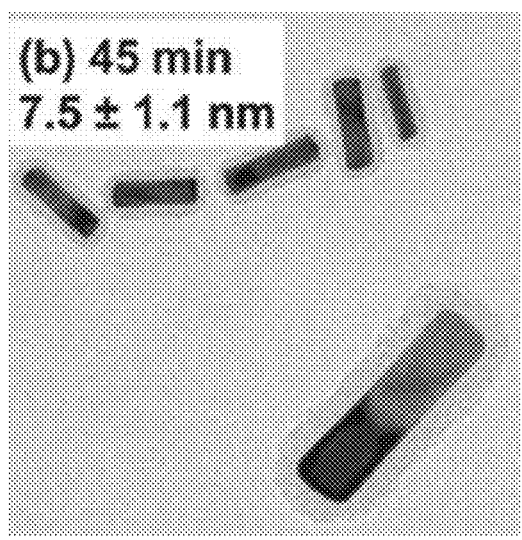
FIG. 5B shows a TEM image for PEG-functionalized $SiO_2$-GNRs (PEG-$SiO_2$-GNRs) synthesized on the 10 mL scale by adding PEG-silane at 45 minutes after adding 125 µL of 20% v/v TEOS solution resulting in a 7.5 nm $SiO_2$ shell thickness.
Figure 5C:
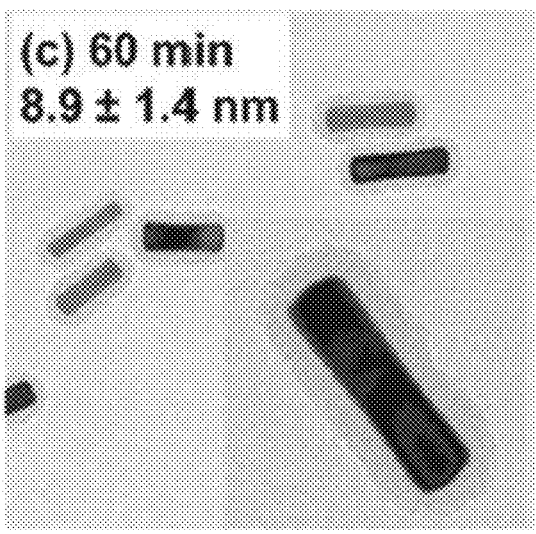
FIG. 5C shows a TEM image for PEG-functionalized $SiO_2$-GNRs (PEG-$SiO_2$-GNRs) synthesized on the 10 mL scale by adding PEG-silane at 60 minutes after adding 125 µL of 20% v/v TEOS solution resulting in an 8.9 nm $SiO_2$ shell thickness.
Figure 5D:
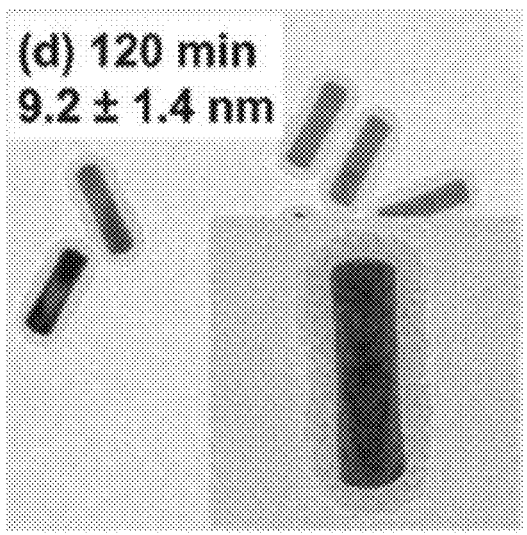
FIG. 5D shows a TEM image for PEG-functionalized $SiO_2$-GNRs (PEG-$SiO_2$-GNRs) synthesized on the 10 mL scale by adding PEG-silane at 120 minutes after adding 125 µL of 20% v/v TEOS solution resulting in a 9.2 nm $SiO_2$ shell thickness.
Figure 6:
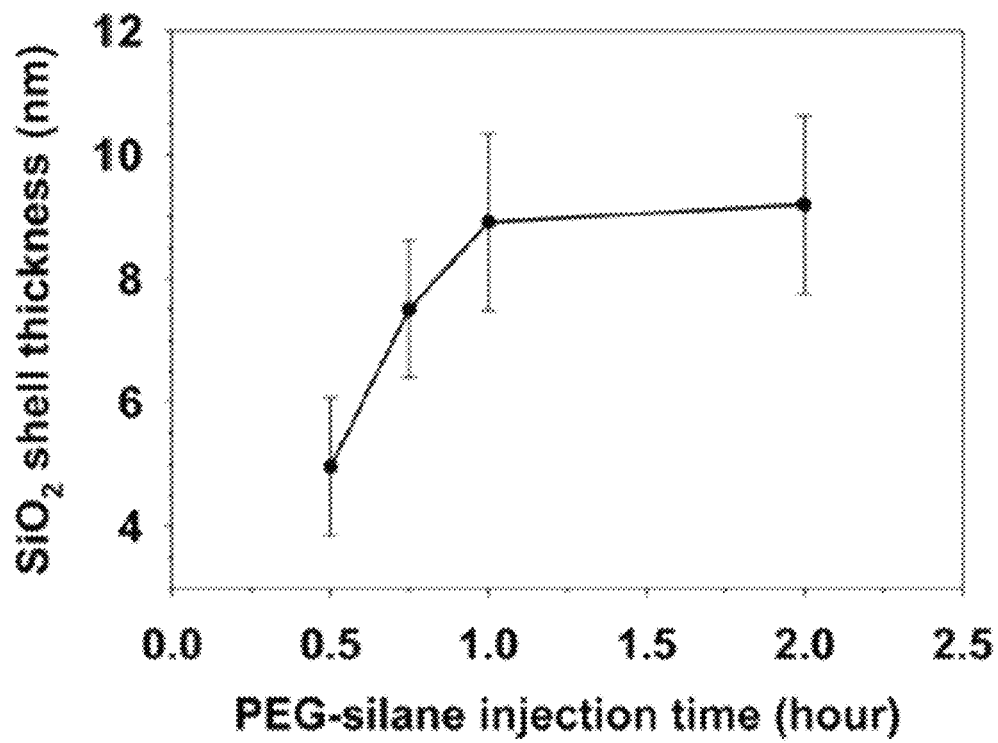
FIG. 6 is a plot of the $SiO_2$ shell thickness as a function of the PEG-silane injection time.

As an alternative to adding less TEOS, SiO$_2$ shells thinner than 10 nm are also obtained, with more precise thickness control, by adding PEG-silane to terminate SiO$_2$ shell growth. The timing of the PEG-silane injection determines the extent of shell growth prior to terminating the reaction. The present method for obtaining ~10 nm thick shells using 125 µL of the 20% TEOS solution is extended by adding 40 µL of PEG-silane at variable times after adding the TEOS solution. For example, injection of PEG-silane 30 minutes after adding the TEOS solution gives a final shell thickness of 5.0 nm, depicted in FIG. 5A. When PEG-silane is added after 45, 60, or 120 minutes, respective shell thicknesses of 7.5, 8.9, and 9.2 nm are obtained (FIGS. 5B-5D). Therefore, SiO$_2$ shell growth is rapid over the first hour but slows significantly during the second hour of growth, as shown in FIG. 6.

Figure 7:
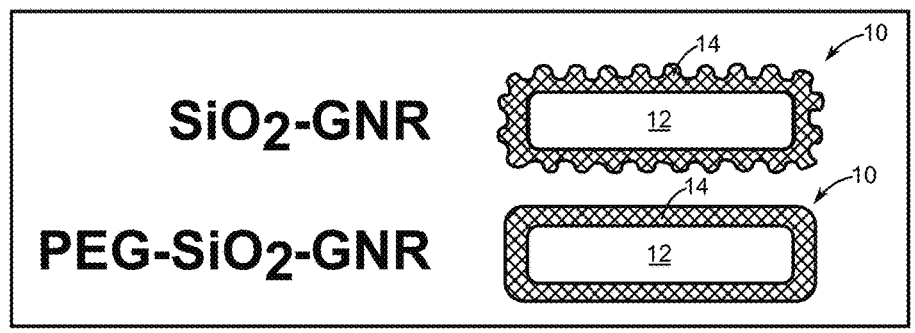
FIG. 7 shows graphical depictions of the morphology of the outer surface of $SiO_2$-GNRs and PEG-$SiO_2$-GNRs.

Termination with PEG-silane also appears to alter the outer surface of the $SiO_2$ shell as shown in FIG. 7. In the absence of PEG-silane, pores in the $SiO_2$ are exposed on the outer surface of $SiO_2$-GNRs. Termination with PEG-silane results in a smoother surface on PEG-$SiO_2$-GNRs, which could be especially important for thin $SiO_2$ shells, where the size of the pores may approach the thickness of the $SiO_2$ shell. While the mechanism for smoothing the surface is not known, this result suggests that PEG-silane is disproportionately deposited into or on top of the exposed pores on the surface of $SiO_2$-GNRs. Apart from the large steric size of the PEG chain, each PEG-silane molecule can form only three Si—O bonds to the $SiO_2$ shell rather than four for TEOS. This difference can also be significant for understanding smoothing when adding PEG-silane.

Optical Absorbance Spectroscopy

Figure 8:
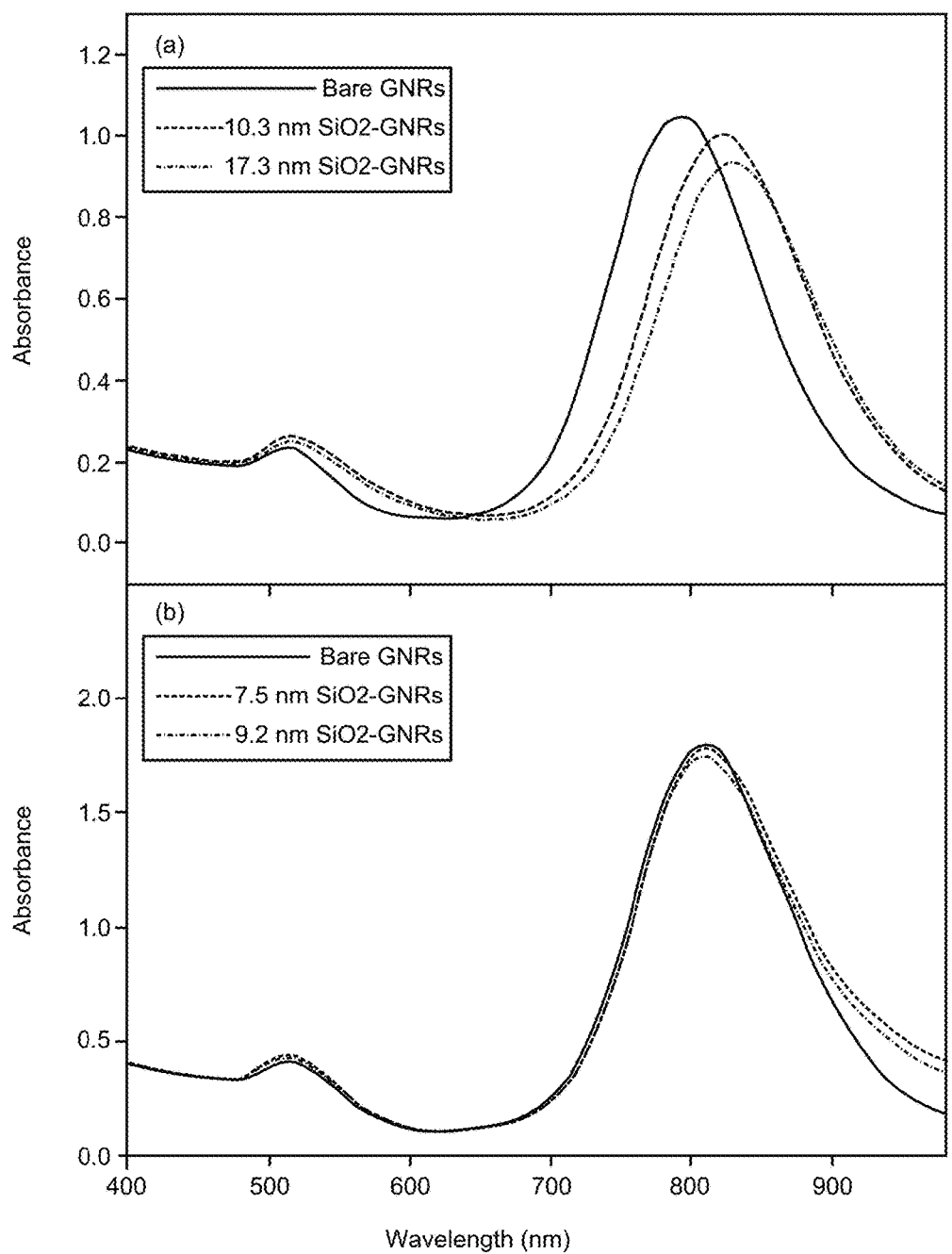
FIG. 8 shows graphs of absorbance spectra of (top) $SiO_2$-GNRs and (bottom) PEG-$SiO_2$-GNRs after purification.

Absorbance spectra of $SiO_2$-GNRs have been acquired immediately upon completion of the overcoating reactions and before purification by diluting the samples with deionized water, as seen in FIG. 8, inset (a). As the $SiO_2$ shell thickness increases, the LSPR absorbance band redshifts. This effect has been attributed to the higher refractive index of $SiO_2$ than water (1.33). Both experiment and theory have shown that the LSPR redshifts when GNRs are dispersed in different solvents, where the magnitude of the redshift scales with the refractive index of the solvent. Reported values for the index of refraction of porous $SiO_2$ ranges between 1.28 and 1.45, where quartz has an index of refraction of 1. It is well known that the index of refraction of $SiO_2$ scales with its density. The redshift for $SiO_2$-GNRs in water indicates that the index of refraction for the $SiO_2$ shells is greater than 1.33, but a value below 1.45 is anticipated due to the porosity of the $SiO_2$ shells. The width of the LSPR absorbance band does not substantially change after depositing $SiO_2$, which indicates that the $SiO_2$-GNRs are well dispersed in solution rather than agglomerated, since agglomeration would cause significant broadening. Unlike CTAB-stabilized GNRs, which disperse well only in water (or in mixtures with water as the major component), $SiO_2$-GNRs and PEG-$SiO_2$-GNRs readily disperse in water, methanol, and ethanol.

Absorbance spectra of PEG-$SiO_2$-GNRs after purification and dispersion in methanol exhibit no shift in the LSPR maximum FIG. 8, inset (b). In contrast, a reduced redshift for PEG-$SiO_2$-GNRs compared with $SiO_2$-GNRs has been reported by others. The absence of a redshift in the LSPR for PEG-$SiO_2$-GNRs can be partially explained by the thinner $SiO_2$ shells than for $SiO_2$-GNRs, where thinner shells are not redshifted as greatly as thicker shells. Nevertheless, a redshift would be expected, since the refractive index of methanol (1.33) is close to that of water (1.33). The PEG coating also affects the optical properties, since the refractive index of PEG-silane (1.45) is likely greater than that of the porous $SiO_2$ shells. While the refractive index of water and methanol is less than that of $SiO_2$, resulting in a redshift for $SiO_2$-GNRs, the refractive index of PEG-silane that is greater than that of $SiO_2$ may reduce the magnitude of the redshift for PEG-$SiO_2$-GNRs.

Large-Scale Synthesis of $SiO_2$-GNRs and PEG-$SiO_2$-GNRs

Figure 9:
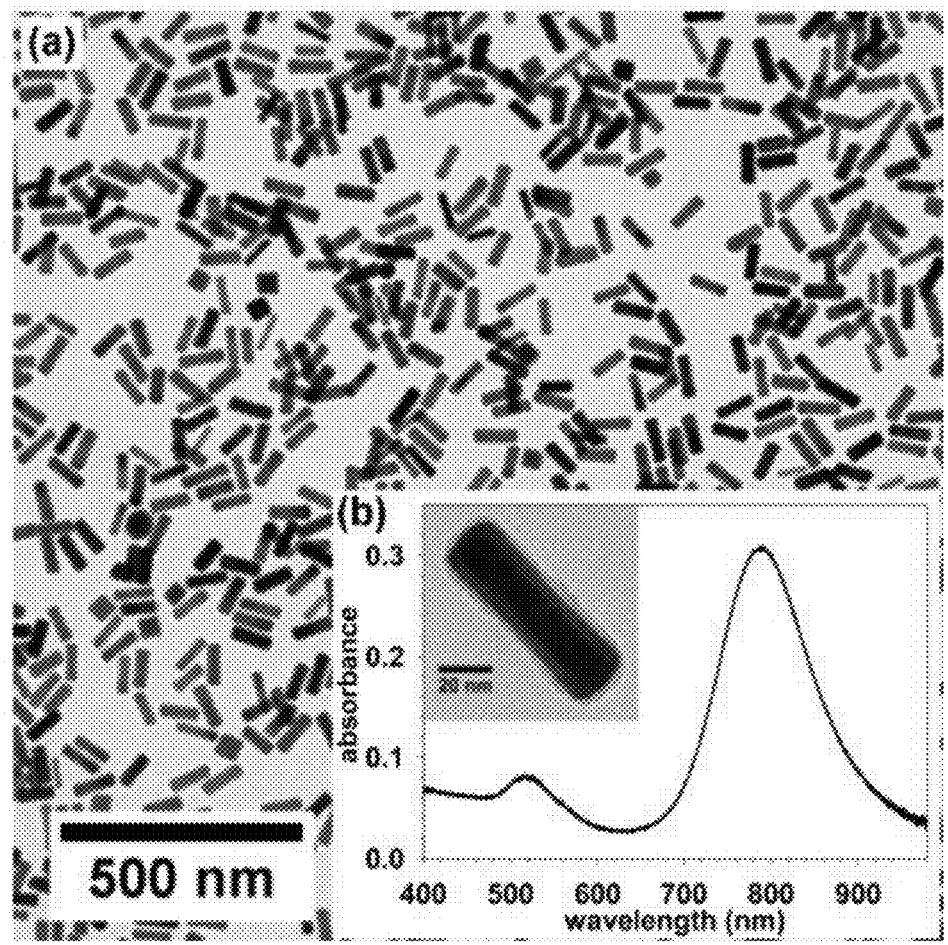
FIG. 9 shows the large-scale (100 mL) synthesis of PEG-$SiO_2$-GNRs with 2.2±0.5 nm thick shells: (a) TEM image and (b) optical absorbance spectrum with inset of a TEM image at higher magnification.

The $SiO_2$-GNR and PEG-$SiO_2$-GNR syntheses have both been scaled to the 100 mL, large-scale. TEM images and optical absorbance spectra for large-scale syntheses of PEG-$SiO_2$-GNRs (using 625 µL of the 20% TEOS solution) with ultrathin $SiO_2$ shells (2.2 nm) and $SiO_2$-GNRs (using 1250 µL of the 20% TEOS solution) with 13.7 nm thick shells are presented in FIG. 9. For the PEG-$SiO_2$-GNRs, the proportional amount of TEOS was reduced (in comparison with the 10 mL scale) to facilitate formation of thinner $SiO_2$ shells. Dropwise addition of 400 µL of PEG-silane while stirring 30 minutes after completing addition of the TEOS solution was followed by stirring for another 30 minutes and then allowing the reaction to continue for 20 hours without stirring. Combining reduction of the amount of TEOS and addition of PEG-silane allows for growth of ultrathin $SiO_2$ shells.

$SiO_2$ Overcoating Under Non-Optimal Conditions

While developing the optimized procedure for depositing uniform $SiO_2$ shells, several other morphologies have been obtained under different conditions (10 mL scale). Since the CTAB coatings on GNRs template deposition of $SiO_2$, the presence of excess CTAB micelles allows for undesired growth of $SiO_2$ NPs that do not encapsulate GNRs. Instead of using an optimized two-step, high-speed centrifugation procedure, a slower centrifugation process (1700 g for 45 seconds) was performed to remove crystallized CTAB while the sample was still cold after refrigeration. This milder purification process still leaves a significant amount of CTAB in solution, which causes formation of $SiO_2$ NPs that do not encapsulate GNRs, along with $SiO_2$-GNRs (FIG. 10A).

When a larger amount (1000 µL) of 20% TEOS solution is introduced into the GNR solution during the 5 minute injection (conducted in the same manner as the optimized method, only adding a larger amount of TEOS solution), irregular $SiO_2$ shells result, where one end of the GNR often protrudes out through the $SiO_2$ shell (FIG. 10B). The non-uniformity can be explained by the larger amount of methanol in which the TEOS is diluted. When the methanol:water ratio exceeds a threshold value, CTAB may begin dissolving from the surface of the GNRs. Curvature at the ends of the GNRs also makes the CTAB layer less stable and more easily removed from the ends than along the sides of the GNRs. Removing the CTAB coatings that template $SiO_2$ deposition on some regions of the GNRs could prevent coating of those regions with $SiO_2$. The asymmetric $SiO_2$ overcoating of GNRs makes them patchy (or Janus) particles, which are of interest for electronic devices, biosensing, drug delivery, and catalysis. Patchy $SiO_2$ overcoatings may also be used for the selective growth of other kinds of materials.

Extending the reaction time, to five (5) days for example, without stirring results in a cross-linked network of $SiO_2$-GNRs (FIG. 10C). Cross-linking is most favorable at the tips of $SiO_2$-GNRs, which can be attributed to the higher surface energy of the tips and reduced steric blockage, as compared with the sides. The GNR cores remain protected by the $SiO_2$ shells and do not coalesce together. Optical absorbance spectra of the cross-linked network exhibit a redshift and broadening in the LSPR. It may be possible to further control the degree of cross-linking by varying the reaction conditions. Supercritical drying of a dispersion of cross-linked $SiO_2$-GNRs can give aerogels. The large number of junctions between $SiO_2$-GNRs may also make these materials attractive for use as SERS substrates.

Cross-linking at long reaction times highlights the importance of the reaction time as a parameter for controlling the $SiO_2$ shell thickness. The reaction time for obtaining "optimal," uniform overcoatings without cross-linking is coupled to other parameters, such as the concentrations and amounts of TEOS and GNRs. Termination with PEG-silane shows that, under optimal conditions, the $SiO_2$ shell grows quickly during the first hour and then more gradually (FIG. 6). When a reaction using 500 µL of the TEOS solution was stopped after 10 h, uniform $SiO_2$ coatings with a thickness of 14.2 nm were obtained (FIG. 10D), in comparison with 17.3 nm when the reaction was run for 20 hours under otherwise identical reaction conditions (FIG. 3F). Therefore, the reaction time may also be used to control the $SiO_2$ shell thickness, but 20 hours reaction times allow the reaction to proceed further toward completion. The amount of TEOS and addition of PEG-silane is used to control the $SiO_2$ shell thickness.

$SiO_2$-GNRs have been synthesized on a large-scale with tunable shell thicknesses by either varying the amount of TEOS or adding PEG-silane to terminate shell growth. By optimizing the CTAB concentration, uniform $SiO_2$ coatings have been obtained, while avoiding formation of $SiO_2$ NPs that do not encapsulate GNRs. The minimal change in the optical absorbance spectrum during the overcoating reaction indicates that cross-linking between PEG-$SiO_2$-GNRs is also avoided. This method may be extended to other kinds of NP core materials coated with CTAB to template $SiO_2$ deposition. Large-scale synthesis of PEG-$SiO_2$-GNRs will facilitate applications that require large amounts of material, and PEG-$SiO_2$-GNRs may be especially well-suited for biomedical applications.

Example 2: Silica Overcoating Reaction and Purification $SiO_2$-GNRs are synthesized via a large-scale $SiO_2$ overcoating method with a small change of the silicate source concentration. In short, all reactions are conducted in a temperature-controlled water bath at 30° C. In order, 0.1 M NaOH and 125 µL TEOS (100% v/v) solution are added into the purified GNR solution. After a 20 hour reaction, 18.9 nm-thick $SiO_2$ overcoated GNRs are formed and the following centrifugation (IEC Centra-MP4 with IEC 854 4×50 rotor) cycles (8500 g, 10 minutes for 5 times) are applied to remove reaction byproducts. Transmission electron microscopy (JEOL 2000FX, operated at 200 kV) is used to confirm the shape and size of the particles. Optical absorbance spectra are acquired using an Ocean Optics CHEMUSB4-VIS-NIR spectrophotometer, and the spectra for $SiO_2$-GNRs are normalized to the spectrum for the uncoated GNRs at 400 nm.

Thermal Heating in Air

GNRs ($SiO_2$-GNRs) are drop cast on the carbon (Ted Pella Ultrathin carbon type A) and SiNx (Ted Pella) supported TEM grids and samples are delivered into a tube furnace without additional pre-treatment such as $O_3$ or plasma cleaning after drying in air for a day. The tube furnace with a temperature controller is used for the thermal heating experiments, and airflow is allowed during the heating/cooling procedure. When the set temperature (100-800° C.) is reached, the temperature is held for an hour before removing the heat. Transmission electron microscopy (JEOL 2000FX, operated at 200 kV) is used to examine those particles after the sample is cooled back at room temperature.

Thermal Heating under Vacuum

Two types of surface coating (C and SiN) of commercial established electronic chips (e-chips) and Aduro TEM holder from Protochips are used for the in situ study, at a pressure of approximately $10^{-10}$ atm. The silicon-based e-chip contains a ceramic membrane integrated heating element that allows the temperature to be ramped up to 1200° C. with a controllable heating rate. The temperature of each e-chip had been calibration from room temperature to 1200° C. in a previous step. Carbon or silicon nitride film is coated over the micron-sized patterned holes of ceramic membrane to support for the NPs. A JEOL 2010F transmission electron microscopy, operated at 200 kV, is used for in situ heating experiments.

GNR and $SiO_2$-GNRs with their longitudinal SPR at 800 nm and 820 nm, respectively are used for both ex situ and in situ heating experiments, and a controlled heating program was used for the in situ studies (FIG. 11).

Heating $SiO_2$-GNRs in Air

Heating experiments in air show that at temperatures below or equal to 400° C., light crosslinking is observed between two $SiO_2$ shells and the porous structure of $SiO_2$ shell is no longer able to be clearly seen in the TEM image of FIG. 12A in comparison to the $SiO_2$ shell without heat treatment of FIG. 12B. A void-like structure formed in the inner $SiO_2$ shell is observed at temperatures above 400° C., as seen in FIGS. 12B and 12C. During heating, the CTAB layer sandwiched between the $SiO_2$ shell and Au core vaporizes, leaving space for GNRs to rearrange the shape and reduce the surface energy. Moreover, the porous $SiO_2$ shell may also become denser and less porous during heating.

As shown in FIG. 12D, at temperatures above 500° C., the outer layer of the $SiO_2$ shell undergoes dewetting and fuses together and the outer shell is thinner than the inner shell based on the contrast of the TEM images. Due to the $SiO_2$ shell becoming unstable, the ability to maintain the shape of the GNRs decreases and results in an increase in the mobility of the GNRs to rearrange their shape under thermal energy and turn into spherical shapes at temperatures below 700° C. (FIG. 12E). However, the reshaped Au NPs are still embedded in $SiO_2$ layers without agglomeration. The rate of the Au NP reshaping and the $SiO_2$ fusing may be different and results in the formation of voids that are occupied by Au NPs (FIG. 12F). After an even higher temperature treatment, the reshaped NPs move closer to each other and the significant decrease in voids in the $SiO_2$ layer indicates that this dynamic behavior could continue at even higher temperatures and a continuous $SiO_2$ film with embedded Au particles may form.

In Situ Heating of $SiO_2$-GNRs in Vacuum

In contrast to heating experiments in air (1 atm), the in situ heating in TEM is under a much lower pressure environment (~$10^{-10}$ atm) and the rod shape of the $SiO_2$-GNRs, deposited on the amorphous carbon substrate, can be preserved at much higher temperature at least 1200° C., which is above the ideal vaporization temperature (885° C.) of bulk Au based on the calculations from Clausius-Clapeyron equation (FIGS. 13A-13E). There has been no previous report of GNRs maintaining their rod shape at 1200° C. In comparison, the $SiO_2$-GNRs on SiN substrates were less stable. The $SiO_2$ shells deformed and the Au cores sublimed 1100° C. (FIGS. 13F-13J). The $SiO_2$ shells were less stable on silicon nitride than on amorphous carbon substrate because of the higher similarity between $SiO_2$ and SiN. A nucleation phenomenon within the SiN substrate was also observed at 1200° C. (FIG. 13J). Engineers at Protochips, have not previously observed such precipitation nucleation when heating their SiN e-chips.

To assess the thermal stability of $SiO_2$-GNRs over time, the temperature dependence of the length, width, and aspect ratio of GNRs during heating at 1200° C. over 10 minutes was studied. (FIG. 14) When the temperature reaches 1200° C., $SiO_2$-GNRs on carbon substrate have undergone minimal deformation (FIG. 13E). While holding the temperature at 1200° C., the extent of deformation increases, but the rod shape is still preserved. The $SiO_2$ shell confines the shape of GNRs, such that the time and energy needed to cause deformation of the GNRs is significantly increased.

In Situ Cooling of $SiO_2$-GNRs in Vacuum

Void form between the Au core and the $SiO_2$ shell, more concentrated at one end of the rod, while cooling from 1200° C. (FIGS. 15A-15J). Void formation is driven by an increase of density in Au when it solidifies. The first void formed at 820° C. and maintained the same void volume and position until the temperature cooled completely to room temperature. The sandwich structure of $SiO_2$-GNRs, where the CTAB layer is between the GNR core and the $SiO_2$ shells, is important to the phenomenon of void formation.

Heating of CTAB-GNRs in Air

A parallel study of the thermal stability of CTAB-stabilized GNRs (CTAB-GNRs) has shown that the CTAB-GNRs on carbon substrate form spheres at temperature below or equal to 300° C. (FIGS. 16A-16C), which is consistent with the previous studies. Similarly, a dramatic reduction in aspect ratio of CTAB-GNRs is observed when heating to 300° C. on a SiN substrate (FIGS. 16D and 16E). Carbon films on TEM grids are not stable during heating in air and are removed by combustion. Similarly, CTAB is also removed by combustion in air.

Since SiN is much more stable than carbon during heating in air, SiN substrates are useful for heating to higher temperatures in air than carbon substrates. SiN substrates permit removal of the CTAB layer whole preserving the SiN substrate. During heating above 300° C., the CTAB-GNRs merged together through Ostwald ripening, forming larger, polydisperse Au particles (FIG. 16E).

In Situ Heating of CTAB-GNRs in Vacuum

When heating CTAB-GNRs under vacuum, similar sublimation processes are observed for CTAB-GNRs for both SiN and carbon substrates at temperatures of 900° C. and 1000° C. FIG. 17A shows a TEM image depicting in which the CTAB-GNRs have been heated to 100° C., before they undergo reshaping and sublimation. TEM images presented in FIGS. 17B-17J are consistent with the predicted vaporization temperature of 885° C.

Example 3: Methods

Chemicals

Cetyltrimethylammonium bromide (CTAB, Sigma Aldrich, 99%, H6269), KBr (Alfa Aesar, ACS, 99% min), $AgNO_3$ (Alfa Aesar, 99.9995%), $HAuCl_4 \cdot xH_2O$ (Alfa Aesar, 99.999%, where x was estimated as 3), deionized water (Ricca, ACS Reagent grade, ASTM Type I, ASTM Type II), ascorbic acid (AA, J. T. Baker, 99.5%), and $NaBH_4$ (Sigma-Aldrich, 99%, 213462) were used in the GNR synthesis. Tetraethoxysilane (TEOS, Alfa Aesar, 99.9%), NaOH (Sigma Aldrich 98%), 2-[methoxy(polyethyleneoxy)propyl] 9-12trimethoxysilane (PEG-silane, Gelest), and methanol, (Macron, UltimAR) were used for the $SiO_2$ overcoating.

Gold Nanorod Synthesis and Purification

CTAB-stabilized GNRs are synthesized and purified to remove excess CTAB by centrifugation according to a method described in U.S. Pat. No. 9,314,849.

$Fe_3O_4$ Overcoating Reaction and Purification-First Method

A dispersion of 1-10 mg of PEG-$SiO_2$-GNRs in methanol is dried by rotary evaporation and redispersed into 10 mL benzyl ether, with required sonication. Fe(III) acetylacetonate ($Fe(acac)_3$) is added to a mixture of 5 mL benzyl ether and 5 mL oleylamine in a three-necked, round-bottomed flask. The mixture is degassed for 1 hour at room temperature before backfilling with nitrogen and then heating to 120° C. for 30 minutes to remove any residual methanol or water residues from the mixture. The temperature is then raised to 290° C. at a rate of 1° C./minute and then held at 290° C. for 30 minutes before cooling back to the room temperature by removing the heat source. The solution is purified to remove small $Fe_3O_4$ NPs by dispersing in ethanol followed by centrifugation. The matter collected in the bottom of the centrifuge tube consists of $Fe_3O_4$-overcoated $SiO_2$-GNRs ($Fe_3O_4$—$SiO_2$-GNRs), while small $Fe_3O_4$ NPs remains suspended in ethanol. This step is then repeated before conducting an additional purification step using a permanent magnet to isolate the $Fe_3O_4$—$SiO_2$-GNRs from ethanol. This magnetic purification procedure is conducted multiple times, until the liquid no longer appears brown in color, indicating nearly complete removal of small $Fe_3O_4$ NPs.

The morphology of the products is confirmed by transmission electron microscopy (JEOL 2000FX, operated at 200 kV). An aberration-corrected FEI Titan 80-300 scanning transmission electron microscope with energy dispersive X-ray spectroscopy (EDS) is used for elemental mapping of the NPs. Optical absorbance spectra are acquired using an Ocean Optics CHEMUSB4-VIS-NIR spectrophotometer.

The surfaces of PEGylated $SiO_2$-GNRs are decorated with multiple $Fe_3O_4$ NPs, and elemental mapping confirms the core-shell structure (FIG. 18). Formation of $Fe_3O_4$ NPs rather than a contiguous layer may be caused by a low number of nucleation sites on the PEGylated surface of the $SiO_2$-GNRs. The relative nucleation and growth rates of $Fe_3O_4$ in reaction are important for determining the morphology of the $Fe_3O_4$.

Different $SiO_2$ shell thicknesses have been studied, and a thickness of 7 nm $SiO_2$ provides the best coverage of $Fe_3O_4$ (FIGS. 19A-19C). Therefore, the ratio of the total surface area-to-iron precursor amount appears to an important factor for achieving more homogeneous magnetic shells. The ultrathin $SiO_2$ shell (2 nm) is less rigid than the thicker shells and does not completely prevent reshaping of GNRs, leaving voids at the tips between GNR cores and $SiO_2$ shells.

The $Fe_3O_4$ overcoating allow for manipulation of GNRs with magnetic fields (FIG. 20A). A drop of a dispersion of $Fe_3O_4$—$SiO_2$-GNRs allowed to evaporate on a TEM grid in the homogeneous magnetic field of an electromagnet exhibits the formation of chains along the field direction (FIG. 20B). The chain is composed, however, of agglomerates $Fe_3O_4$—$SiO_2$-GNRs that exhibit both side-by-side and tip-to-tip arrangements. Whether agglomeration occurs before or after application of the magnetic field is not clear, and the $SiO_2$ shells could also potentially undergo crosslinking at high temperature.

$Fe_3O_4$ Overcoating Reaction and Purification-Second Method

A second method of uniformly coating $SiO_2$-GNRs (FIG. 21) with smaller $Fe_3O_4$ NPs without adding a linker to bind the $Fe_3O_4$ NPs to the surface of the GNRs is provided. The $SiO_2$-GNRs are a specific embodiment of the non-spherical nanostructures 10 of FIG. 1A and the smaller $Fe_3O_4$ NPs are the iron oxide particles 24 of FIG. 1E. The purpose of the $Fe_3O_4$ overcoating is that it provides magnetic functionalization with minimal alteration of the LSPR peak (FIG. 23). The $Fe_3O_4$ overcoating is the iron oxide particulate coating 22 of FIG. 1E. The second method is unique from the first method as well as other methods in that it does not add a linker to bind the $Fe_3O_4$ to the surface of $SiO_2$-GNRs. The $Fe_3O_4$ coated $SiO_2$-GNRs are specific embodiments of the functionalized non-spherical nanostructure 20 depicted in FIG. 1E.

In the second method, a concentrated dispersion of SiO$_2$ GNRs (FIG. 21) in THF or MeOH are injected into a dispersion of Fe$_3$O$_4$ NPs in hexanes, toluene, of THF and mixed thoroughly. Ethanol is added to the solution, causing the Fe$_3$O$_4$ NPs to precipitate onto the surface of the SiO$_2$-GNRs. The solution is centrifuged at 4,000 rpm for 5 minutes, and the supernatant is removed. The precipitate is redispersed in hexanes, toluene, or THF. This solution (FIG. 22) comprises Fe$_3$O$_4$-coated SiO$_2$-GNRs. The Fe$_3$O$_4$—SiO$_2$-GNRs are sedimented using a permanent magnet, the supernatant removed, and the sediment redispersed in hexanes, toluene, or THF.

FIG. 23 is a graph of normalized optical absorption spectra of SiO$_2$-GNRs before and after Fe$_3$O$_4$ overcoating. There is a small shift in the optical absorption spectrum toward longer wavelengths after overcoating with Fe$_3$O$_4$.

Synthesis of Dumbbell-Shaped Nanostructures

While the methods disclosed above have a similar protocol, at least one substantial difference is required to form the complex silica overcoatings disclosed below. One substantial difference is that a TEOS:MeOH reaction solution has a concentration of only five (5) v/v % TEOS, as opposed to 20 v/v % TEOS disclosed above. In this embodiment, GNRs with nonuniform silica morphologies may be selectively synthesized by varying the concentration of the TEOS:MeOH solution injected into a GNR solution. Silica morphologies ranging from uniform to lobed, and intermediate structures between the two, may be generated. In addition to this shape control, specific size control has been achieved by varying GNR concentration. In contrast to previous published results, this disclosure's results illustrate more distinct morphologies over a broader spectrum of sizes and shapes.

EXPERIMENTAL

In an exemplary embodiment, CTAB-stabilized gold nanorods having dimensions of 80 nm×20 nm are prepared, concentrated (10×) and injected with reaction solutions of TEOS and methanol of varying concentrations via syringe pump over a period of around 5 minutes. After injection, the reaction solutions are stirred for 30 minutes and then left un-agitated for 20 hours in a 30° C. water-bath. A final product is centrifuged in methanol four times with each cycle being held at 10,000 rpm for 10 minutes. After each centrifugation cycle, a supernatant is removed and the sample is reduced to approximately 2.0 mL before adding additional methanol for a subsequent centrifugation cycle. Upon completion of all four centrifugation cycles, the silica-coated gold nanorods are brought to a volume of approximately 1.0 mL for storage. Samples were characterized using a JEOL 2000 FX transmission electron microscope at an accelerating voltage of 200 kV.

FIG. 24 shows SiO$_2$-GNRs that were synthesized using 100% v/v TEOS. FIGS. 25A-25D show dumbbell-shaped non-spherical nanostructures created while changing GNR concentration within a 5% v/v TEOS in a methanol regime. FIG. 25A shows results of a 5 times concentrated GNR solution. Notice that in this case, the nanorod is fully encapsulated as depicted in FIG. 1F. FIG. 25B shows a 10× concentrated GNR solution. In this case, the dumbbell-shaped nanostructures have bare waists as depicted in FIG. 1G. FIG. 25C shows a 15× concentrated GNR solution, wherein the lobes are smaller than the lobes of FIG. 25B. FIG. 25D shows a 20× concentrated GNR solution. In this case, at the 20× concentrated GNR solution, SiO$_2$ lobes are not obtained.

FIGS. 26A-26D show results of SiO$_2$ shell deposition termination using PEG-silane. In particular, FIG. 26A shows a single dumbbell-shaped nanostructure having a relatively thin waist diameter. FIG. 26B appears to show some cross-linking between a pair of nanostructures. FIG. 26C shows a dumbbell-shaped nanostructure having a thicker waist in comparison to the dumbbell-shaped nanostructure of FIG. 26A. FIG. 26D shows that the lobes of the dumbbell-shaped nanostructures provide separation of adjacent nanorods.

FIGS. 27A-27D show additional examples of dumbbell-shaped nanostructures after SiO$_2$ shell deposition termination using PEG-silane. FIG. 27A shows a dumbbell-shaped nanostructure with a relatively rough outer surface. FIG. 27B provides an example of some crosslinking between three dumbbell-shaped nanostructures. FIG. 27C shows dumbbell-shaped nanostructures having some angular lobe features. FIG. 27D shows another dumbbell-shaped nanostructure.

FIG. 28 is a graph of absorbance spectra versus wavelength of silica-coated GNRs synthesized from varying concentrations of TEOS (v/v %) in MeOH. FIG. 29 is a graph of absorbance spectra versus wavelength of SiO$_2$-GNRs synthesized using different GNR concentrations. Deposition of SiO$_2$ causes minor shifts in the optical absorbance spectrum (FIGS. 28 and 29).

Some examples of the present disclosure address this need and provide methods that successfully increase the scale of SiO$_2$-GNR synthesis to approximately 200 mg with excellent control over the SiO$_2$ shell thickness (2-30 nm). Therefore, the present technology may provide immediate commercialization benefits as it can be easily scaled to larger amounts.

Those skilled in the art will recognize improvements and modifications to the preferred embodiments of the present disclosure. All such improvements and modifications are considered within the scope of the concepts disclosed herein and the claims that follow.

What is claimed is:

1. A method for synthesizing non-spherical nanostructures comprising:
providing nanoparticles (NPs) wherein each of the NPs comprises a non-spherical NP that includes gold and a surfactant coating covering the non-spherical NP;
mixing the NPs and a pH modifier solution to provide a pH-modified solution of NPs having a pH within a predefined pH range; and
adding a silica precursor solution to the pH-modified solution of NPs at a constant rate for at least one (1) minute to provide a homogeneous silica solution of NPs.

2. The method for synthesizing non-spherical nanostructures of claim 1 wherein adding the silica precursor solution to the pH-modified solution of NPs is conducted at a constant rate for at least two (2) minutes to provide a homogeneous silica solution of NPs.

3. The method for synthesizing non-spherical nanostructures of claim 1 wherein adding the silica precursor solution to the pH-modified solution of NPs is conducted at a constant rate for at least three (3) minutes to provide a homogeneous silica solution of NPs.

4. The method for synthesizing non-spherical nanostructures of claim 1 wherein adding the silica precursor solution to the pH-modified solution of NPs is conducted at a constant rate for at least four (4) minutes to provide a homogeneous silica solution of NPs.

5. The method for synthesizing non-spherical nanostructures of claim 1 wherein adding the silica precursor solution to the pH-modified solution of NPs is conducted at a constant rate for at least five (5) minutes to provide a homogeneous silica solution of NPs.

6. The method for synthesizing non-spherical nanostructures of claim 1 further comprising depositing a silica overcoat onto the surfactant coating of each of the NPs by maintaining the homogeneous silica solution of NPs at a temperature that is between 25° C. and 40° C. for a predetermined reaction time to provide silica-coated NPs.

7. The method for synthesizing non-spherical nanostructures of claim 6 further including adding a deposition stop solution to the homogeneous silica solution of NPs to terminate deposition of silica on the silica-coated NPs before the predetermined reaction time is reached to provide silica-coated NPs having a silica coating thickness that is less than 10 nanometers (nm) thick.

8. The method for synthesizing non-spherical nanostructures of claim 6 further including adding an iron oxide particulate coating onto the silica-coated NPs.

9. The method for synthesizing non-spherical nanostructures of claim 8 wherein adding the iron oxide particulate coating does not add a linker to bind the iron particulate coating to the silica-coated NPs.

10. The method for synthesizing non-spherical nanostructures of claim 1 wherein the NPs are gold nanorods.

11. The method for synthesizing non-spherical nanostructures of claim 1 wherein the NPs are made of gold alloy having a percentage of gold composition that is at least 40 atomic %.

12. The method for synthesizing non-spherical nanostructures of claim 1 wherein the surfactant coating is cetyltrimethylammonium bromide (CTAB).

13. The method for synthesizing non-spherical nanostructures of claim 1 wherein the pH modifier solution is a base solution of sodium hydroxide (NaOH).

14. The method for synthesizing non-spherical nanostructures of claim 13 wherein the predefined pH range is from about 10 to 12.

15. The method for synthesizing non-spherical nanostructures of claim 1 wherein the silica precursor solution is tetraethoxysilane (TEOS).

16. The method for synthesizing non-spherical nanostructures of claim 6 wherein the predetermined reaction time is between 1 hour and 30 hours.

17. The method for synthesizing non-spherical nanostructures of claim 16 wherein the predetermined reaction time is between 19 hours and 21 hours.

18. The method for synthesizing non-spherical nanostructures of claim 6 wherein the homogeneous silica solution of NPs is contained without agitation for the predetermined reaction time after adding the silica precursor solution to the pH-modified solution of NPs.

19. The method for synthesizing non-spherical nanostructures of claim 6 wherein a shell thickness of a $SiO_2$ shell encapsulating individual ones of the silica-coated NPs is between 2 nm and 30 nm.

20. The method for synthesizing non-spherical nanostructures of claim 6 yielding at least 190 milligrams of silica-coated NPs per a process batch of the homogeneous silica solution of NPs.

21. The method for synthesizing non-spherical nanostructures of claim 6 wherein at least 50% of the silica-coated NPs are dumbbell-shaped such that bulbous opposing ends are connected by a waist, which has a waist diameter that is less than an average of maximum diameters of the bulbous opposing ends.

22. The method for synthesizing non-spherical nanostructures of claim 1 comprising:
    depositing a silica overcoat onto the surfactant coating of each of the NPs by maintaining the homogeneous silica solution of NPs at a temperature that is between 25° C. and 40° C. for a predetermined reaction time to provide silica-coated NPs;
    mixing a deposition stop solution and the homogeneous silica solution of NPs to terminate deposition of silica on the silica-coated NPs; and
    adding an iron oxide particulate coating onto the silica-coated NPs.

23. The method for synthesizing non-spherical nanostructures of claim 22 wherein a shell thickness of a $SiO_2$ shell encapsulating individual ones of the silica-coated NPs is less than 10 nm thick.

24. The method for synthesizing non-spherical nanostructures of claim 22 wherein adding the iron oxide particulate coating does not add a linker to bind the iron oxide particulate coating to the silica-coated NPs.

25. The method for synthesizing non-spherical nanostructures of claim 22 wherein the NPs are gold nanorods.

26. A method for synthesizing non-spherical nanostructures comprising:
    providing a solution of nanoparticles (NPs) wherein each of the NPs comprises a non-spherical NP that includes gold and a surfactant coating covering the non-spherical NP; and
    adding a silica precursor solution to the solution of NPs at a constant rate for at least one (1) minute to provide a homogeneous silica solution of NPs.

27. The method for synthesizing non-spherical nanostructures of claim 26 wherein adding the silica precursor solution to the solution of NPs is conducted at a constant rate for at least two (2) minutes to provide a homogeneous silica solution of NPs.

28. The method for synthesizing non-spherical nanostructures of claim 26 wherein adding the silica precursor solution to the solution of NPs is conducted at a constant rate for at least three (3) minutes to provide a homogeneous silica solution of NPs.

29. The method for synthesizing non-spherical nanostructures of claim 26 wherein adding the silica precursor solution to the solution of NPs is conducted at a constant rate for at least four (4) minutes to provide a homogeneous silica solution of NPs.

30. The method for synthesizing non-spherical nanostructures of claim 26 wherein adding the silica precursor solution to the solution of NPs is conducted at a constant rate for at least five (5) minutes to provide a homogeneous silica solution of NPs.

31. The method for synthesizing non-spherical nanostructures of claim 26 further including depositing a silica overcoat onto the surfactant coating of each of the NPs by maintaining the homogeneous silica solution of NPs at a temperature that is between 25° C. and 40° C. for a predetermined reaction time to provide silica-coated NPs.

32. The method for synthesizing non-spherical nanostructures of claim 31 further including adding a deposition stop solution to the homogeneous silica solution of NPs to terminate deposition of silica on the silica-coated NPs before the predetermined reaction time is reached to provide silica-coated NPs having a silica coating thickness that is less than 10 nm thick.

33. The method for synthesizing non-spherical nanostructures of claim 31 further including adding an iron oxide particulate coating onto the silica-coated NPs.

34. The method for synthesizing non-spherical nanostructures of claim 33 wherein adding the iron oxide particulate coating does not add a linker to bind the iron oxide particulate coating to the silica-coated NPs.

35. The method for synthesizing non-spherical nanostructures of claim 26 wherein the non-spherical NP is a gold nanorod.

* * * * *